(12) United States Patent
Mori

(10) Patent No.: US 11,648,947 B2
(45) Date of Patent: May 16, 2023

(54) ROAD SURFACE STATE DETERMINATION DEVICE AND TIRE SYSTEM INCLUDING THE SAME

(71) Applicant: DENSO CORPORATION, Kariya (JP)

(72) Inventor: Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 227 days.

(21) Appl. No.: 17/121,552

(22) Filed: Dec. 14, 2020

(65) Prior Publication Data

US 2021/0094552 A1    Apr. 1, 2021

Related U.S. Application Data

(63) Continuation of application No. PCT/JP2019/025401, filed on Jun. 26, 2019.

(30) Foreign Application Priority Data

Jun. 27, 2018    (JP) .............................. JP2018-122212

(51) Int. Cl.
*B60W 40/06*    (2012.01)
*B60W 40/12*    (2012.01)

(52) U.S. Cl.
CPC ............ *B60W 40/06* (2013.01); *B60W 40/12* (2013.01); *B60W 2422/70* (2013.01); *B60W 2530/20* (2013.01); *B60W 2556/45* (2020.02)

(58) Field of Classification Search
CPC .................................................... B60W 40/06
See application file for complete search history.

(56) References Cited

U.S. PATENT DOCUMENTS

| 6,907,778 | B2 * | 6/2005 | Kogure | ............... B60W 40/068 73/146 |
| 9,434,387 | B2 * | 9/2016 | Hanatsuka | ............... B60C 99/00 |
| 2005/0044944 | A1 | 3/2005 | Kogure et al. | |
| 2015/0210286 | A1 | 7/2015 | Hanatsuka et al. | |
| 2016/0202147 | A1 | 7/2016 | Svantesson et al. | |
| 2020/0256672 | A1 * | 8/2020 | Sekizawa | ............... G06N 20/10 |
| 2021/0094552 | A1 * | 4/2021 | Mori | ............... B60C 19/00 |

FOREIGN PATENT DOCUMENTS

| JP | 2005-125812 | A | 5/2005 |
| JP | 2014035279 | A | 2/2014 |
| JP | 2016-537259 | A | 12/2016 |
| WO | WO-2014/025018 | A1 | 2/2014 |
| WO | WO-2019142868 | A1 | 7/2019 |

* cited by examiner

*Primary Examiner* — Michael A Berns
(74) *Attorney, Agent, or Firm* — Harness, Dickey & Pierce, P.L.C.

(57) ABSTRACT

A vehicle body side system has a second data communication unit that receives road surface data transmitted from a first data communication unit, a storage unit that stores teacher data, a road surface determination unit that determines a road surface state on a traveling road surface of a vehicle based on the road surface data and the teacher data, and a tire identification unit that identifies a predetermined type as an identification target and identifies which content the tire corresponds to in the type. The tire identification unit identifies the tire based on the identification data transmitted from the tire side device, and the road surface determination unit determines the road surface state using a teacher data corresponding to the tire identification result, when the road surface determination unit determines the road surface state.

9 Claims, 15 Drawing Sheets

ROAD SURFACE STATE DETERMINATION DEVICE AND TIRE SYSTEM INCLUDING THE SAME

CROSS REFERENCE TO RELATED APPLICATION

This application is a continuation application of International Patent Application No. PCT/JP2019/025401 filed on Jun. 26, 2019, which designated the U.S. and based on and claims the benefits of priority of Japanese Patent Application No. 2018-122212 filed on Jun. 27, 2018. The entire disclosure of all of the above applications is incorporated herein by reference.

TECHNICAL FIELD

The present disclosure relates to a road surface state determination device that detects a vibration applied to a tire by a tire side device and determines a road surface state based on a vibration data, and a tire system including the same.

BACKGROUND

A road surface state determination device includes an acceleration sensor on a back surface of a tire tread, detects a vibration applied to the tire by the acceleration sensor, and estimates a road surface state based on a detection result of the vibration.

SUMMARY

An object of the present disclosure is to provide a road surface state determination device that can determine a road surface state more accurately and in a short time, and a tire system including the same.

In a road surface state determination device according to one aspect of the present disclosure, a tire side device has a vibration detection unit that outputs a detection signal according to a magnitude of the vibration of the tire, a waveform processing unit generates a road surface data indicating a road surface state that appears in the waveform of the detection signal, and a first data communication unit that transmits road surface data. A vehicle body side system has a second data communication unit that receives road surface data transmitted from a first data communication unit, a storage unit that stores teacher data, a road surface determination unit that determines a road surface state on a traveling road surface of a vehicle based on the road surface data and the teacher data, and a tire identification unit that identifies a predetermined type as an identification target and identifies which content the tire corresponds to in the type. Further, the tire side device generates identification data used for tire identification based on the detection signal in the waveform processing unit, and transmits the identification data through the first data communication unit. In the vehicle side system, the tire identification unit identifies the tire based on the identification data transmitted from the tire side device, and the road surface determination unit determines the road surface state using a teacher data corresponding to the tire identification result, when the road surface determination unit determines the road surface state.

Here, a parenthesized reference symbol attached to each constituent element or the like shows an example of the correspondence of the constituent element or the like and a specific constituent element or the like described in an embodiment to be described later.

DETAILED DESCRIPTION

Figure 1:
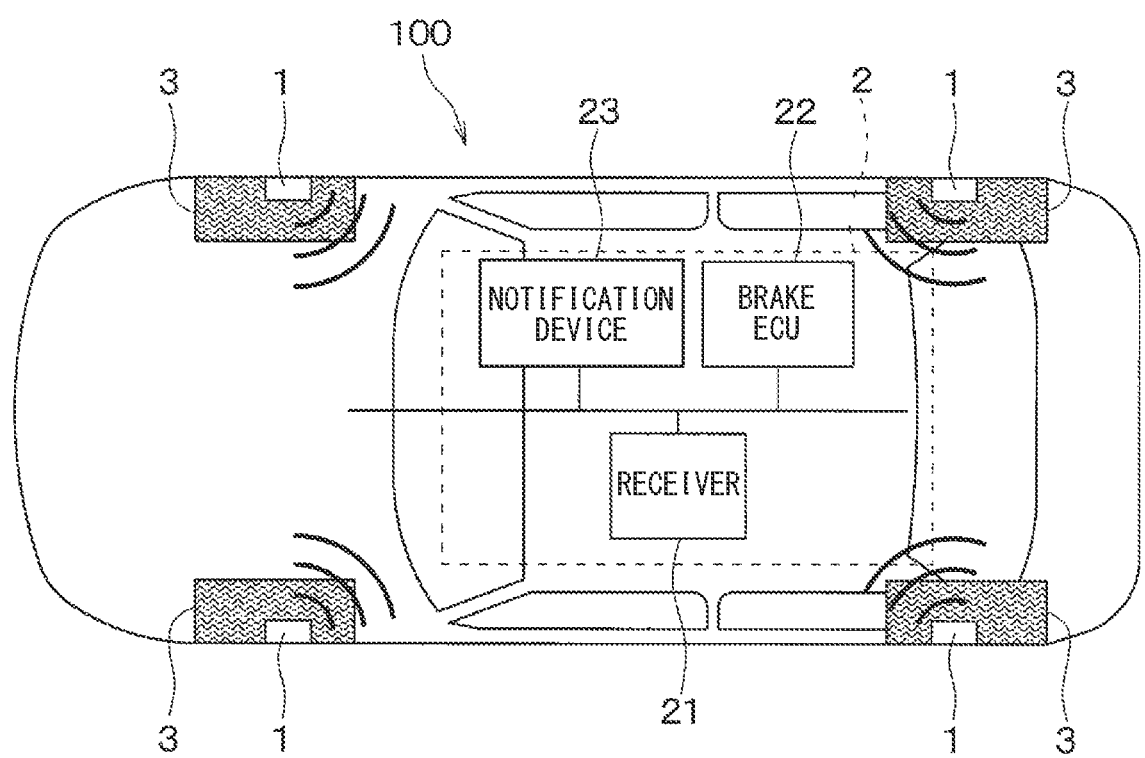
FIG. 1 is a schematic view showing an overall configuration of a tire system according to a first embodiment.

In an assumable example, a road surface state determination device includes an acceleration sensor attached to a rear surface of a tire tread to detect a vibration applied to the tire, and estimates a road surface state based on a detection result of the vibration. This road surface state determination device creates a data relating to the road surface state based on a vibration waveform of the tire detected by the acceleration sensor, and transmitting the data of each road wheel to a vehicle body side receiver and the like so as to determine the road surface state. The determination of the road surface state is performed using a support vector that has been learned in advance. Then, by estimating the road surface state, it becomes possible to call the driver's attention.

The vibration of the tire used for estimating the road surface state varies depending on the tire, for example a type of tire such as summer tires and winter tires and tire manufacturers. Therefore, an optimum support vector used to determine the road surface state differs for each tire. However, the vibration detection unit such as the acceleration sensor for detecting the vibration applied to the tire is applied to various types of tires. Therefore, whether attached to any tire in advance is not known. For this reason, in relation to the support vector used for determining the road surface state, a support vector having improved robustness is used so as to be compatible with various tire types, tire manufacturers, and the like. Therefore, there arises a problem that the determination accuracy of the road surface state becomes poor and the determination takes time.

An object of the present disclosure is to provide a road surface state determination device that can determine a road surface state more accurately and in a short time, and a tire system including the same.

In a road surface state determination device according to one aspect of the present disclosure, a tire side device has a vibration detection unit that outputs a detection signal according to a magnitude of the vibration of the tire, a waveform processing unit generates a road surface data indicating a road surface state that appears in the waveform of the detection signal, and a first data communication unit that transmits road surface data. A vehicle body side system has a second data communication unit that receives road surface data transmitted from a first data communication unit, a storage unit that stores teacher data, a road surface determination unit that determines a road surface state on a traveling road surface of a vehicle based on the road surface data and the teacher data, and a tire identification unit that identifies a predetermined type as an identification target and identifies which content the tire corresponds to in the type. Further, the tire side device generates identification data used for tire identification based on the detection signal in the waveform processing unit, and transmits the identification data through the first data communication unit. In the vehicle side system, the tire identification unit identifies the tire based on the identification data transmitted from the tire side device, and the road surface determination unit determines the road surface state using a teacher data corresponding to the tire identification result, when the road surface determination unit determines the road surface state.

The tire identification identifies which of the contents included in the determined identification target is included in the tire 3, and the road surface state can be determined t by using the support vector corresponding to the tire identification result. Therefore, the road surface state can be determined by using the support vector most corresponding to the vibration characteristics of the tire to which the tire side device is attached, and the road surface state can be determined more accurately and in a short time.

Hereinafter, embodiments of the present disclosure will be described with reference to the drawings. In the following embodiments, the same or equivalent parts are denoted by the same reference numerals.

First Embodiment

A tire system 100 having a road surface state determination function according to the present embodiment will be described with reference to FIG. 1 to FIG. 9. The tire system 100 according to the present embodiment determines a road surface state based on the vibration applied to a ground contact surface of the tire provided on each wheel of the vehicle, and performs a warning of danger of the vehicle, a vehicle motion control, and the like based on the determined road surface state.

Figure 2:
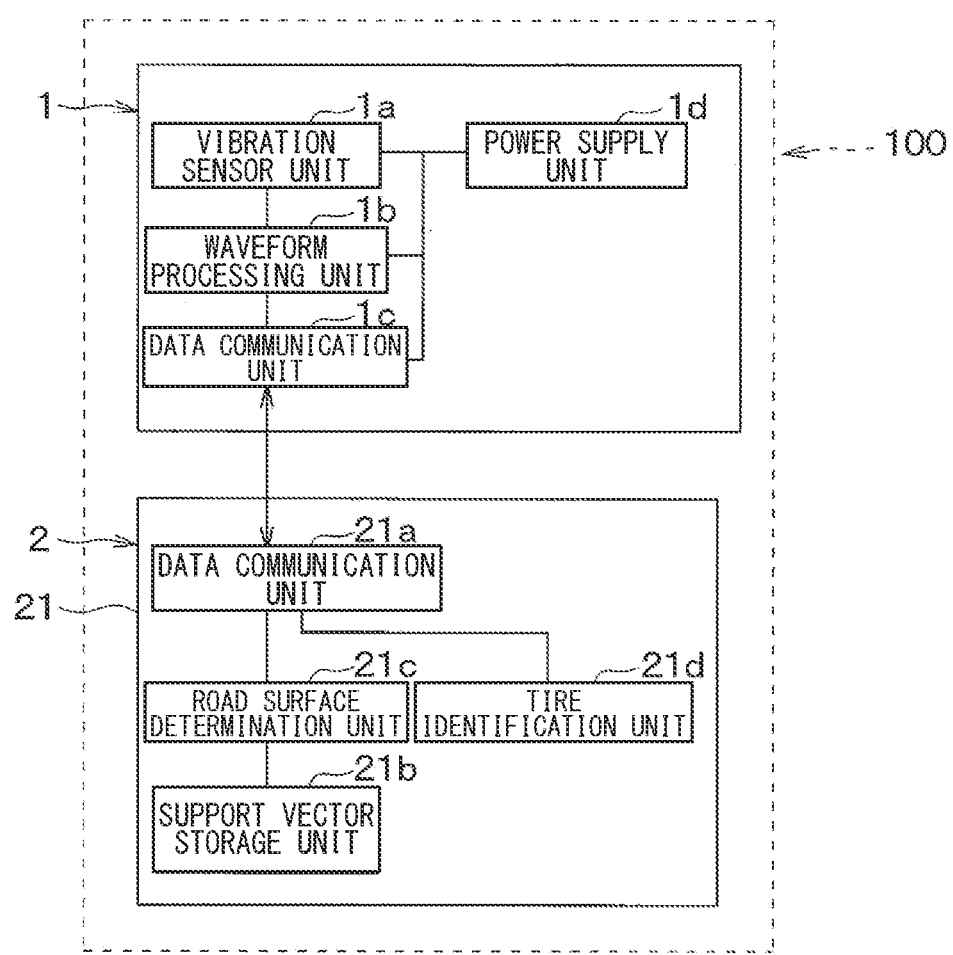
FIG. 2 is a block diagram illustrating respective detailed configurations of the tire side device and a vehicle body side system.

As shown in FIG. 1 and FIG. 2, the tire system 100 is configured to have tire side devices 1 provided on each of wheel sides and a vehicle body side system 2, which includes various parts provided on the vehicle body side. The vehicle body side system 2 includes a receiver 21, an electronic control unit 22 for brake control (hereinafter referred to as a brake ECU), a notification device 23 and the like. A part of the tire system 100, which performs a road surface state determination operates as a road surface state determination device. In the present embodiment, the tire side devices 1 and the receiver 21 of the vehicle body side system 2 configure the road surface state determination device.

In the tire system 100 according to the present embodiment, data (hereinafter, referred to as road surface data) corresponding to the road surface state of a road, on which the tire 3 rotates, is transmitted from the tire side device 1, and the receiver 21 receives the road surface data to determine the road surface state. In addition, the tire system 100 is configured to transmit the determination result of the road surface state determined by the receiver 21 to the notification device 23 and cause the notification device 23 to notify the determination result of the road surface state. It is thus made possible to notify a driver of the road surface state, for example, that the road surface is dry, wet or frozen. It is also made possible to warn the driver if the road surface is slippery. In addition, the tire system 100 is configured to perform vehicle motion control for avoiding danger by transmitting the road surface state to the brake ECU 22 and the like that perform vehicle motion control. For example, when the road surface is frozen, the braking force generated with respect to the brake operation amount is weakened as compared with the case of a dry road, so that the vehicle motion control corresponding to a low road surface friction coefficient $\mu$ is performed. Specifically, the tire side device 1 and the receiver 21 are configured as follows.

Figure 3:
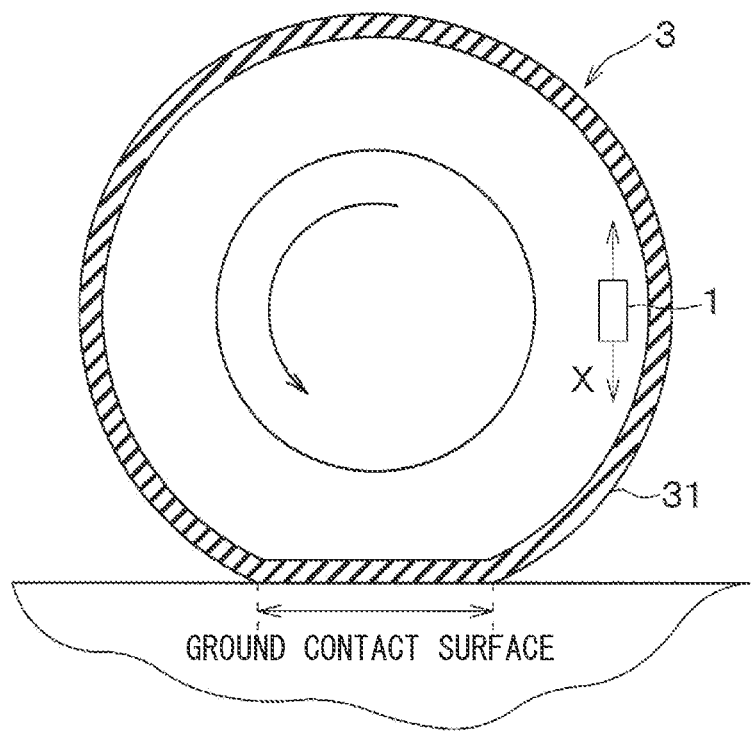
FIG. 3 is a schematic view showing in cross section a tire to which the tire side device is attached.

The tire side device 1 is arranged in each of the tires 3 and is capable of bidirectional communication with the vehicle body side system 2. Specifically, as shown in FIG. 2, the tire side device 1 is configured to include a vibration sensor unit 1a, a waveform processing unit 1b, a data communication unit 1c, and a power supply unit 1d, and as shown in FIG. 3, it is provided on a back side of a tread 31 of the tire 3.

The vibration sensor unit 1a is configured as a vibration detection unit for detecting vibrations applied to the tire 3. For example, the vibration sensor unit 1a is configured by an acceleration sensor. In case that the vibration sensor unit 1a is the acceleration sensor, the vibration sensor unit 1a outputs a detection signal of acceleration as a detection signal, which corresponds to the magnitude of the vibration in a direction in contact with a circular trajectory drawn up by the tire side device 1 at the time of rotation of the tire 3, for example, that is, in a tire tangential direction indicated by an arrow X in FIG. 3. More specifically, the acceleration acquisition unit 10 generates, as a detection signal, an output voltage in which one of the two directions indicated by the arrow X is positive and the opposite direction is negative. For example, the vibration sensor unit 1a performs acceleration detection at a predetermined sampling cycle set at a cycle shorter than a period of one rotation of the tire 3, and outputs a detection result as the detection signal.

Although the case where the vibration sensor unit 1a detects vibration in the tire tangential direction has been described here, the same operation can be performed by detecting vibration in another direction, for example, in the tire radial direction.

The waveform processing unit 1b is formed of a known microcomputer including a CPU, a ROM, a RAM, an I/O, and the like, performs signal processing of the detection signal based on a program stored in the ROM or the like, and generates the road surface data representing the road surface state appearing in the detection signal. Here, as the road surface data, data including a characteristic value of tire vibration is used. In addition, the waveform processing unit 1b performs signal processing of the detection signal to generate identification data that is data used to identify the tire from the tire vibration that appears in the detection signal. The specifying data may be the road surface data described above, but in the present embodiment, different data, for example, the raw waveform data of the detection signal itself is used as an identification data.

Specifically, the waveform processing unit 1b performs waveform processing of a vibration waveform indicated by the detection signal by using the detection signal output from the vibration sensor unit 1a as a detection signal representing vibration data in the tangential direction of the tire, and extracts a characteristic value of tire vibration. In the present embodiment, the waveform processing unit 1b performs a signal processing on the detection signal of the acceleration of the tire 3 (hereinafter referred to as tire G), and extracts the characteristic value of the tire G. Further, the waveform processing unit 1b acquires a raw waveform that is the detection signal itself of the vibration sensor unit 1a, performs signal processing such as noise removal as necessary, and converts it into data (hereinafter, date converted from the raw waveform is referred to as a raw waveform data). Then, the waveform processing unit 1b transmits the data including the extracted characteristic value as a road surface data and the raw waveform data as identification data to the data communication unit 1c. Details of the characteristic value will be described later.

Further, the waveform processing unit 1b controls data transmission from the data communication unit 1c, and transmits road surface data or identification data to the data communication unit 1c at a timing at which the data transmission is desired. Thus, data communication from the data communication unit 1c can be performed. For example, the waveform processing unit 1b extracts the characteristic value of the tire G each time the tire 3 makes one rotation, and transmits the road surface data to the data communication unit 1c once or a plurality of times each time the tire 3 makes one rotation or a plurality of rotations. Further, the waveform processing unit 1b generates raw waveform data once or a plurality of times each time the tire 3 makes one rotation or a plurality of rotations at the start of traveling, and transmits the raw waveform data to the data communication unit 1c. For example, the waveform processing unit 1b transmits the road surface data, the road surface data including the characteristic value extracted during one rotation of the tire 3 when transmitting the raw waveform, or the raw waveform data to the data communication unit 1c.

The data communication unit 1c constitutes a first data communication unit and performs data communication with a data communication unit 21a of the receiver 21 in the vehicle body side system 2 described later. The data communication unit 1c is configured to be able to perform bidirectional communication with the data communication unit 21a. The data communication unit 1c is exemplified as a single unit, but may be configured separately as a transmission unit and a reception unit. Various forms of bidirectional communication can be applied, such as Bluetooth communication including BLE (Bluetooth Low Energy) communication, wireless LAN (Local Area Network) such as wifi, Sub-GHz communication, ultra wideband Communication, ZigBee, etc. can be applied. "Bluetooth" is a registered trademark.

For example, when the data communication unit 1c receives the road surface data or the identification data from the waveform processing unit 1b, the data communication unit 1c transmits the road surface data or the identification data at the timing. The timing of data transmission from the data communication unit 1c is controlled by the waveform processing unit 1b. Then, whenever the road surface data or the identification data is sent from the waveform processing unit 1b every time the tire 3 makes one rotation or a plurality of rotations, the data transmission from the data communication unit 1c is performed.

The power supply unit 1d is provided as a power supply for the tire side device 1, and supplies electric power to each unit included in the tire side device 1 so that each unit can be operated. The power supply unit 1d is configured by a battery such as a button battery, for example.

On the other hand, the receiver 21, the brake ECU 22 and the notification device 23 forming the vehicle body side system 2 are configured to become operable when a start switch such as an ignition switch (not shown) is turned on.

As shown in FIG. 2, the receiver 21 is configured to include a data communication unit 21a, a support vector storage unit 21b, a road surface determination unit 21c, and a tire identification unit 21d.

The data communication unit 21a constitutes a second data communication unit, and receives the road surface data and the identification data transmitted from the data communication unit 1c of the tire side device 1. The data communication unit 21a plays a role of transmitting them to the road surface determination unit 21c and the tire identification unit 21d.

The support vector storage unit 21b stores the support vector, and stores, for example, for each type of road surface, the support vector corresponding to the identification target for tire identification, as described later.

The support vector is a characteristic value serving as a model, and is acquired, for example, by learning using a support vector machine. The support vector is acquired by experimentally driving a vehicle equipped with the tire side device 1 on each type of road surface. During the experimental driving, the characteristic value extracted by the waveform processing unit 1b is learned for a predetermined number of tire rotations, and a predetermined number of typical characteristic values are extracted from the learned data. The support vector is the predetermined number of typical characteristic values. For example, the characteristic values are learned for one million rotations for each type of road surface, and a typical characteristic value for one hundred rotations is extracted from the learned values as the support vector.

The identification target means the type of the tires 3 to be identified by identifying the tire. For example, "tire type" such as summer tires, winter tires, and all-season tires can be cited as the identification targets. In this case, "tire type" is the type to be the identification target, and "summer tire", "winter tire", etc. are specific contents of the tire 3 included in the type. When the tire manufacturer can be identified in addition to the type of the tire 3, the "tire type that identifies the tire manufacturer" is the type to be the identification target. Further, for example, the type of the tire 3 and the brand of the tire 3 that is more detailed than the tire manufacturer (hereinafter referred to as the tire brand), in other words, the tire ID that is the identification information of the tire can be set as the type to be the identification target. Further, tires having similar vibration characteristics may be used as a tire group, and a plurality of categories (hereinafter, referred to as tire categories) in which the tire groups are classified may be types to be the identification target.

The support vector corresponding to the identification target means a support vector for each content of the tire 3 included in the type of the identification target mentioned above. That is, the support vector corresponding to the identification target means a support vector for each content included in the "tire type" if the identification target is the "tire type". Further, when the "tire manufacturer" is the identification target in addition to the "tire type", the support vector for each content of the "tire type that specifies the tire manufacturer" is the support vector corresponding to the identification target. Similarly, if the identification target is "tire brand", the support vector for each content of "tire brand" id the support vector corresponding to the identification target, and if the identification target is "tire category", the support vector for each content of "tire category" is the support vector corresponding to the identification target. For example, if the "tire type" contains two types of contents, "summer tire" and "winter tire", the support vector for each type of road surface for "summer tire" and the support vector for each type of road surface for "winter tire". The support vector for each type of road surface are the support vector corresponding to the identification target.

As described above, the support vector storage unit 21b stores the support vector corresponding to the identification target depending on which of the above-described identification targets by the tire identification unit 21d is.

The road surface determination unit 21c is configured by a well-known computer including a CPU, a ROM, a RAM, an I/O, etc., and performs various processing according to a program stored in the ROM or the like to determine a road surface state. Specifically, the road surface determination unit 21c determines the road surface state by comparing the characteristic value included in the road surface data transmitted from the waveform processing unit 1b with the support vector stored in the support vector storage unit 21b.

For example, the road surface determination unit 21c compares the characteristic value included in the road surface data received at present time with the support vectors stored for each type of the road surface, and determines the road surface corresponding to the support vector which is closest to the present characteristic value to be a presently traveling road surface. The support vector used at this time is the support vector corresponding to the content identified by the tire identification among the support vectors corresponding to the above-mentioned identification targets, and is the support vector that is most suitable for the vibration characteristics of the tire 3 to which the tire side device 1 is attached.

After determining the road surface state, the road surface determination unit 21c transmits the road surface state to the notification device 23, which notifies a driver of the road surface state if necessary. Thus, the driver tries to drive the vehicle in a manner matching the road surface state and it is possible for driver to avoid potential danger to the vehicle. For example, the determined road surface state may be displayed always by the notification device 23 or the road surface state may be displayed to warn the driver only when the vehicle need be driven more carefully than usual, for example, when the determined road surface state corresponds to a wet road or a frozen road. The road surface state is transmitted from the receiver 21 to an ECU such as the brake ECU 22, which performs vehicle motion control, so that the vehicle motion control is performed based on the transmitted road surface state.

The tire identification unit 21d identifies a tire based on the identification data transmitted from the tire side device 1. In the tire identification, one of "tire type", "tire type that identifies the tire manufacturer", "tire brand" or "classification of tire 3" is determined as the identification target, and it is identified which of the contents in the determined identification targets the tire 3 corresponds to. As an example, the tire identification unit 21d identifies which of the contents included in the "tire type" such as the summer tire and the winter tire when the identification target is the "tire type". For example, it identifies that the tire 3 corresponds to a "summer tire".

Figure 4A:
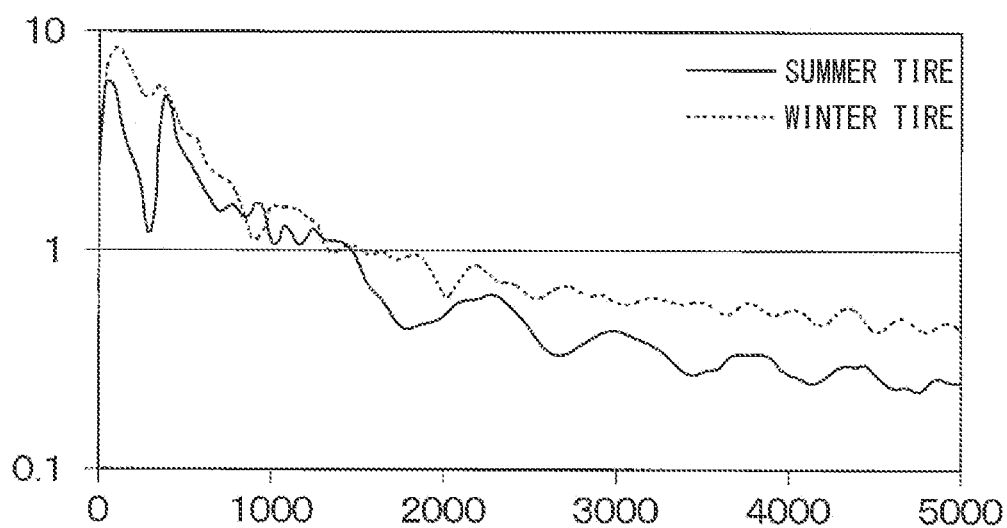
FIG. 4A is a diagram showing a frequency analysis result of a detection signal of a vibration sensor unit.
Figure 4B:
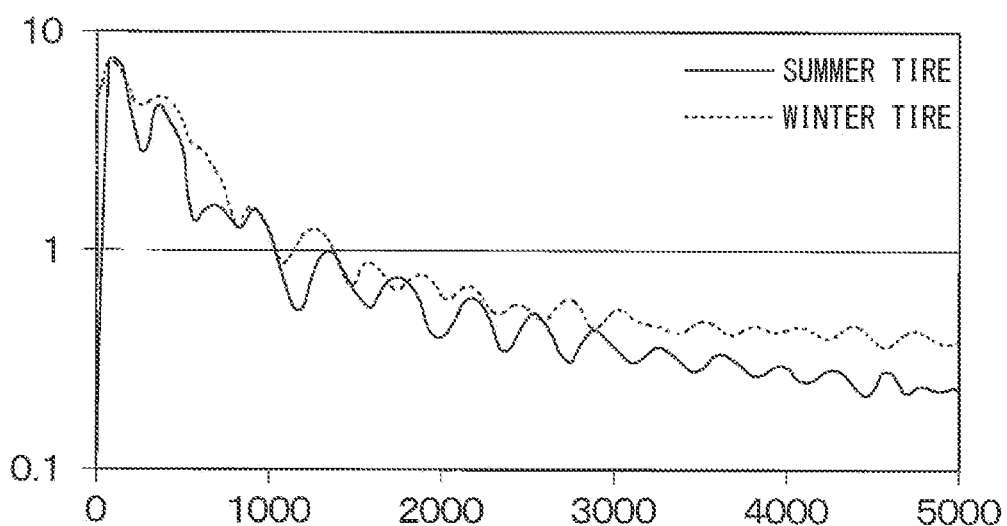
FIG. 4B is a diagram showing the frequency analysis result of the detection signal of the vibration sensor unit.

The vibration characteristics of the tire 3 differ depending on the tire type and the like. For example, the frequency analysis result of the detection signal of the vibration sensor unit 1a in each of the summer tire and the winter tire is as shown in FIGS. 4A and 4B. Although these drawings show the case where the road surface state is a dry road surface and a wet road surface, in both cases, the value of the high frequency component of 2000 Hz, for example, differs depending on the tire type. Therefore, it is possible to perform the frequency analysis of the identification data and identify the tire type based on the frequency analysis result. For example, if a voltage value of the detection signal at 2000 kHz or higher after frequency analysis is larger than a threshold value, it can be identified as the summer tire, and if it is smaller than the threshold value, it can be identified as the winter tire, whereby the "tire type" can be identified. It is also possible to identify the "tire type" by obtaining an integrated value of the voltage value of the detection signal after frequency analysis and comparing the integrated value with a threshold value.

In addition, here, the case where the identification target in tire identification is the "tire type" has been described as an example. However, the above description is merely an example, and by classifying the vibration characteristics of the tire 3 indicated by the detection signal of the vibration sensor unit 1a in more detail, it is possible to identify not only the "tire type" but also the "tire type that identify the tire manufacturer" or the "tire brand" as the identification target. In the vibration characteristics of the tire 3, data is previously obtained by an experiment in correspondence with what is desired to be identified, such as "tire type", "tire type that identifies the tire manufacturer", or "tire brand". Then, if the range of the vibration characteristics of the tire 3 is set for each object to be identified by tire identification, for example, for each "tire brand", based on experimental results and the like, the "tire brand" can be identified based on which range the vibration characteristics of the tire 3 obtained at the time of tire identification belong. As an example, a threshold range that partitions each tire brand is set, and it is determined which threshold range the voltage value of the detection signal after frequency analysis is included in. Therefore, the "tire brand" can be identified. For example, the tire brand can be identified by determining to which threshold range the voltage value of the detection signal at 2000 kHz or higher after frequency analysis belongs, or to which threshold range the integrated value of the voltage value of the detection signal after frequency analysis belongs.

The brake ECU 22 constitutes a brake control device that performs various brake controls. Specifically, the brake ECU 22 controls a braking force by increasing or decreasing a wheel cylinder pressure by driving an actuator, which controls a brake fluid pressure. In addition, the brake ECU 22 independently controls the braking force of each road wheel. When the road surface state is transmitted from the receiver 21, the brake ECU 22 controls the braking force as the vehicle motion control based on the transmitted road surface state. For example, when the transmitted road surface state indicates a frozen road, the brake ECU 22 weakens the braking force generated in response to the amount of brake operation by the driver, as compared with a dry road surface. Thereby, wheel slip can be suppressed, and danger of the vehicle can be avoided.

The notification device 23 is configured with a meter display device, for example, and used to notify the driver of the road surface state. In case that the notification device 23 is configured with the meter display device, it is located at a position which the driver is capable of easy recognition during driving of the vehicle, for example, within an instrument panel in the vehicle. When the road surface state is transmitted from the transceiver 21, the meter display device visually notifies the driver of the road surface state by performing display in such a manner that the state of the road surface can be grasped.

The notification device 23 may alternatively be configured as a buzzer or a voice guidance device. In such a case, the notification device 23 notifies the driver of the road surface state audibly by buzzer sound or voice guidance. Although the meter display device is exemplified as the notification device 23 providing visual notification, the notification device 23 may be configured as a display device that displays information such as a head up display.

The tire system 100 is configured as described above in the present embodiment. Each unit forming the vehicle body side system 2 is connected through an in-vehicle LAN (Local Area Network) like CAN (Controller Area Network) communication. Therefore, each part can communicate information with each other through the in-vehicle LAN.

As described above, the tire system including the tire side device 1 and the vehicle body side system 2 according to the present embodiment is configured.

Next, a description will be given of details of the characteristic values extracted by the waveform processing unit 1b described above.

The characteristic values mentioned herein are quantities indicative of features of vibration applied to the tire 3 and acquired by the vibration sensor unit 1a, which are represented by, e.g., feature vectors.

Figure 5:
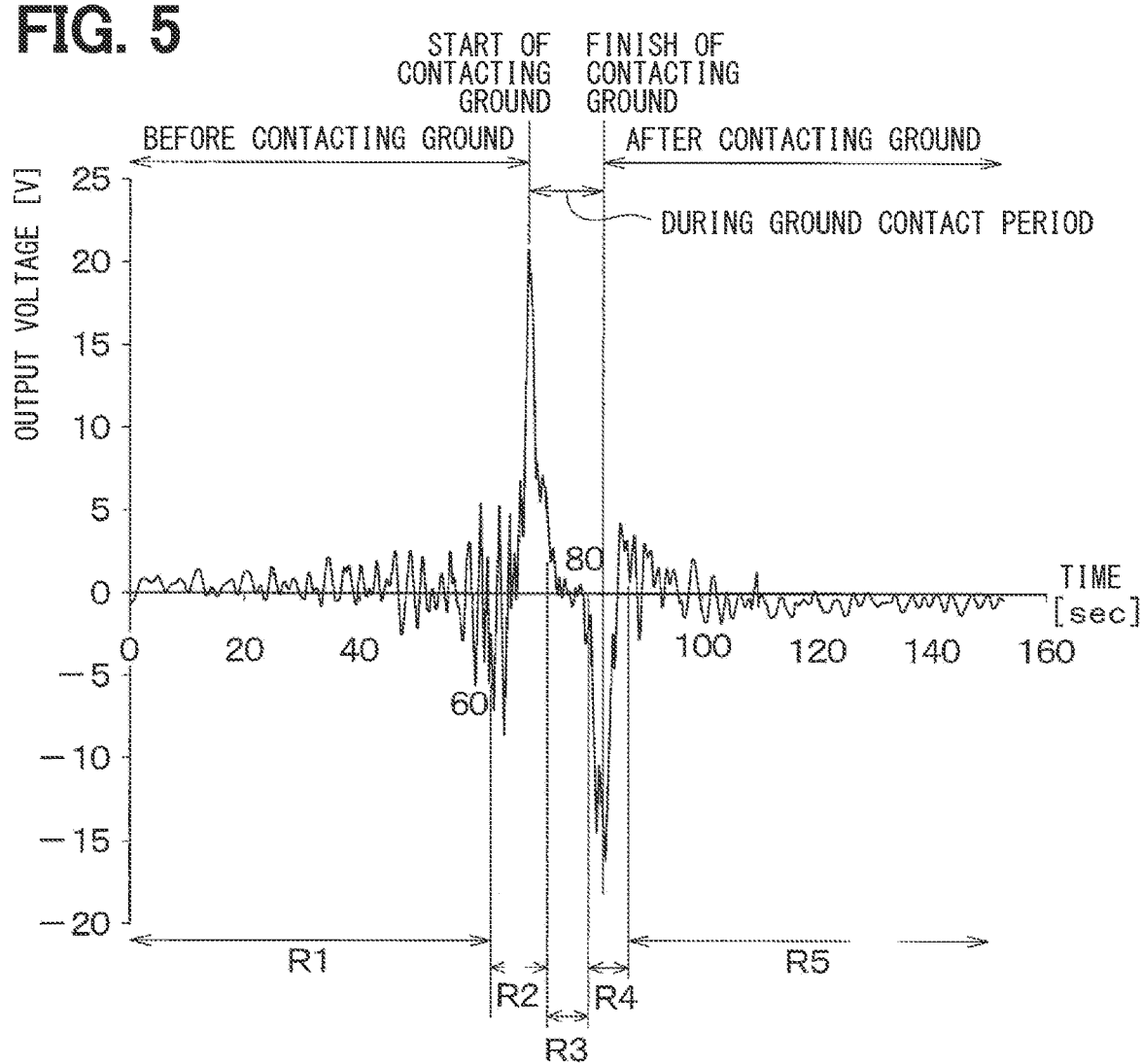
FIG. 5 is an output voltage waveform chart of a vibration sensor unit during rotation of the tire.

The output voltage waveform of the detection signal of the vibration sensor unit 1a during tire rotation is, for example, the waveform shown in FIG. 5. As shown in this figure, the output voltage of the vibration sensor unit 1a has a local maximum value at a start of contacting the ground when a portion of the tread 31 of the tire 3 corresponding to the vibration sensor unit 1a starts to ground as the tire 3 rotates. Hereinafter, a peak value at the start of contacting the ground when the output voltage of the vibration sensor unit 1a has the local maximum value is referred to as a first peak value. Further, as shown in FIG. 5, when the tire 3 rotates, the output voltage of the vibration sensor unit 1a has a local minimum value at a finish of contacting the ground when a portion of the tread 31 corresponding to the location of the vibration sensor unit 1a is not grounded from the start that it was grounded as the tire 3 rotates. Hereinafter, a peak value at the finish of contacting the ground where the output voltage of the vibration sensor unit 1a has the local minimum value is referred to as a second peak value.

The output voltage of the vibration sensor unit 1a takes the peak value at the above timing for the following reason. When the portion of the tread 31 corresponding to the position of the vibration sensor unit 1a contacts the ground with the rotation of the tire 3, a portion of the tire 3, which had a substantially cylindrical surface, is pressed to be deformed into a flat shape in the vicinity of the vibration sensor unit 1a. Upon receiving an impact at this time, the output voltage of the vibration sensor unit 1a has a first peak value. When the portion of the tread 31 corresponding to the position of the vibration sensor unit 11 moves away from the ground contact surface as the tire 3 rotates, the tire is released from the pressing force in the vicinity of the vibration sensor unit 1a, and the flat shape of the portion of the tire 3 returns to the substantially cylindrical shape. Upon receiving the impact when the shape of the tire 3 returns to the original shape, the output voltage of the vibration sensor unit 1a has a second peak value. As described above, the output voltage of the vibration sensor unit 1a takes the first peak value and the second peak value at the start of contacting the ground and at the finish of contacting the ground, respectively. Since a direction of impact when the tire 3 is pressed and a direction of impact when the tire 3 is released from pressurization are opposite, polarities of the output voltages are also opposite.

Here, the moment at which the portion of the tire tread 31 corresponding to the location of the vibration sensor unit 1a contacts the road surface is referred to as a "step-in region", and the moment at which the portion of the tire tread 31 corresponding to the location of the vibration sensor unit 1a moves away the road surface is referred to as a "kick-out region". The "step-in region" includes a timing when the first peak value is reached, and the "kick-out region" includes a timing when the second peak value is reached. In addition, a region before the step-in region is referred to as a "pre-step-in region", a region from the step-in region to the kick-out region, that is, a region where the tire tread 31 corresponding to the location of the vibration sensor unit 1a is in contact with the ground, is referred to as a "pre-kick-out region", and a region after the kick-out region is referred to as a "post-kick-out region". In this manner, the period in which the portion of the tire tread 31 corresponding to the location of the vibration sensor unit 1a is in contact with the ground and before and after that portion can be divided into five regions. In FIG. 5, the pre-step-in region, the step-in region, the pre-kick-out region, the kick-out region and the post-kick-out region of the detection signal are indicated as five regions R1 to R5 in sequence, respectively.

The vibration generated in the tire 3 varies in each of the divided regions according to the road surface state, and the detection signal of the vibration sensor unit 1a changes correspondingly. Therefore, by analyzing the frequency of the detection signal of the vibration sensor unit 1a in each region, the road surface state of the vehicle on the road surface is detected. For example, in a slippery road surface such as a snow-covered road, the shearing force at the time of kicking out decreases, so that a band value selected from 1 kHz to 4 kHz band becomes small in the kick-out region R4 and the post-kick-out region R5. Since each frequency component of the detection signal of the vibration sensor unit 1a changes according to the road surface state, it is possible to determine the road surface state based on the frequency analysis of the detection signal.

Figure 6:
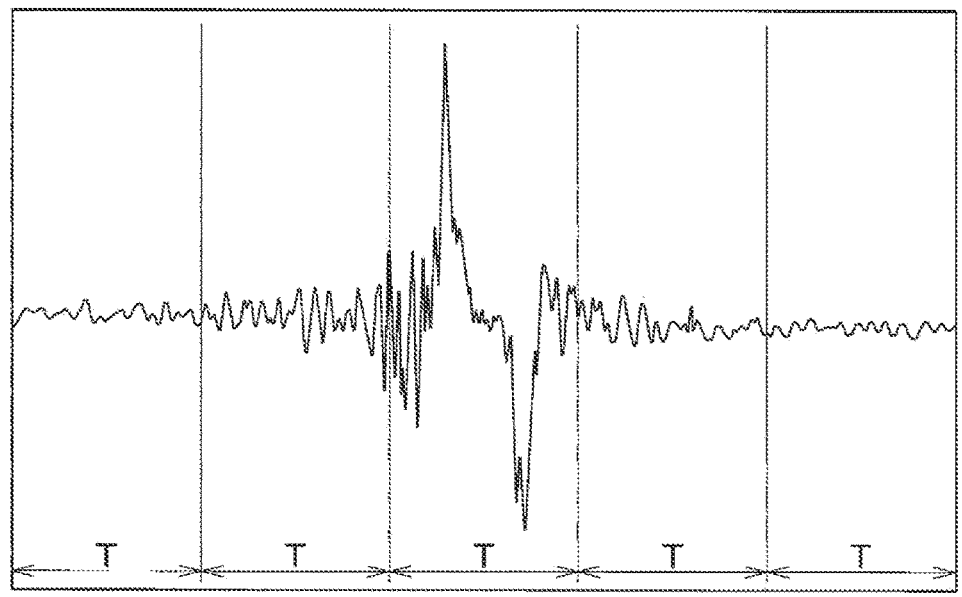
FIG. 6 is a chart which shows a detection signal of the vibration sensor unit in a manner divided into plural time zones each of which is a time window of a predetermined time width T.

The waveform processing unit 1b divides the detection signal of the vibration sensor unit 1a for one rotation of the tire 3 having a continuous time axis waveform into a plurality of sections each having a predetermined time width T as shown in FIG. 6, performs the frequency analysis in each section, and extracts the characteristic value. Specifically, by performing the frequency analysis in each section, the waveform processing unit 1b calculates a power spectrum value in each frequency band, that is, a vibration level in a specific frequency band, and this power spectrum value is used as the characteristic value.

The number of sections divided by the time window of the time width T is a value that varies with the vehicle speed, more specifically, with the rotation speed of the tire 3. In the following description, the number of sections for one rotation of the tire 3 is assumed to be "n" (where "n" is a natural number).

For example, the characteristic value is calculated as the power spectrum value, which is acquired by passing the detection signal of each section through a plurality of filters of a specific frequency band, for example, five band-pass filters of 0 to 1 kHz, 1 to 2 kHz, 2 to 3 kHz, 3 to 4 kHz and 4 to 5 kHz. This characteristic value is called a characteristic vector, and the characteristic vector Xi of a section i (where i is a natural number of 1≤i≤n) is expressed as a matrix having power spectrum values of each specific frequency band as elements as shown in the following equation. The power spectrum value of each specific frequency band is indicated by $a_{ik}$.

$$X_i = \begin{bmatrix} a_{i1} \\ a_{i2} \\ a_{i3} \\ a_{i4} \\ a_{i5} \end{bmatrix} \quad \text{[Equation 1]}$$

"K" of the power spectrum value $a_{ik}$ is the number of the specific frequency bands, that is, the number of the band-pass filters. In case that the frequency band of 0 to 5 kHz is divided into five sections as exemplified above, "k" is 1 to 5. The determinant X that comprehensively represents the characteristic vectors X1 to Xn of all the sections 1 to n is as follows.

$$X = \begin{pmatrix} a_{11} & a_{21} & \cdots & a_{n1} \\ a_{12} & a_{22} & \cdots & a_{n2} \\ a_{13} & a_{23} & \cdots & a_{n3} \\ a_{14} & a_{24} & \cdots & a_{n4} \\ a_{15} & a_{25} & \cdots & a_{n5} \end{pmatrix} \quad \text{[Equation 2]}$$

This determinant X is an equation representing the characteristic value of one rotation of the tire. The waveform processing unit 1b extracts the characteristic value represented by the above determinant X by frequency-analyzing the detection signal of the vibration sensor unit 1a.

Subsequently, the operation of the tire system according to the present embodiment will be described with reference to FIGS. 7 to 8.

Figure 7:
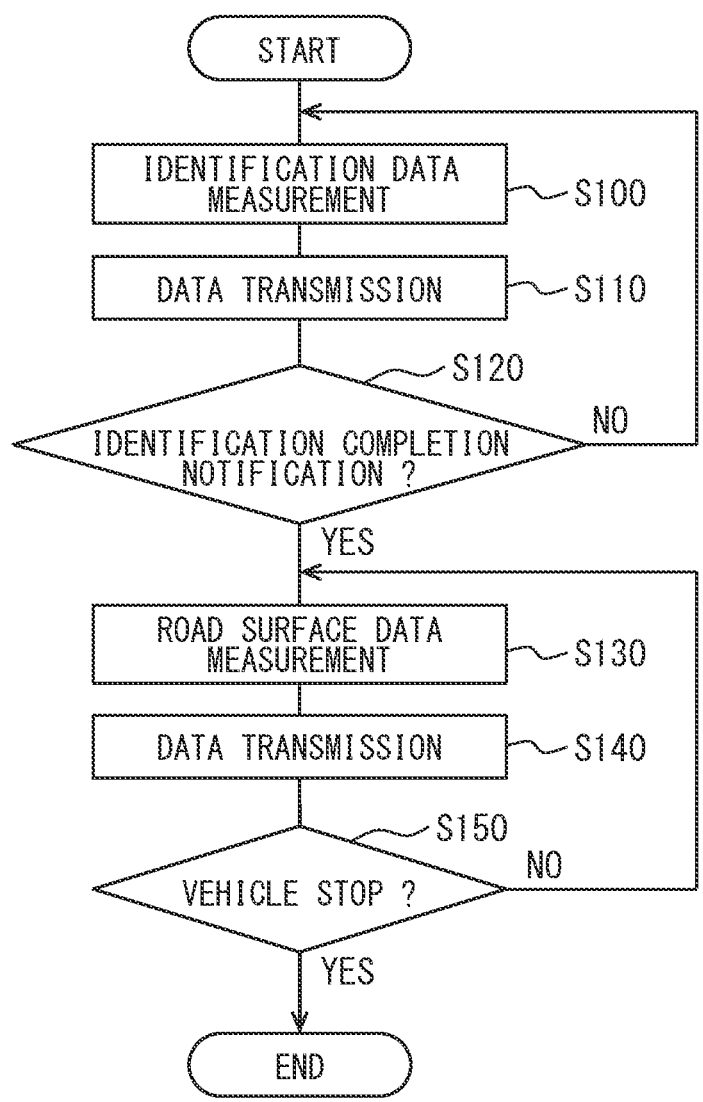
FIG. 7 is a flowchart showing details of tire side processing.

In the tire side device 1 of each wheel, the waveform processing unit 1b executes the tire side processing shown in FIG. 7. When the start of traveling of the vehicle is detected based on the detection signal of the vibration sensor unit 1a, this processing is executed at predetermined control cycles. Further, the receiver 21 executes the vehicle body side processing shown in FIG. 8. This processing is executed by the cooperative operation of the road surface determination unit 21c, the tire identification unit 21d, and the like when the start switch is turned on, and is executed at predetermined control cycles. Hereinafter, these processing will be described in order in chronological order.

First, as the tire side processing, in step S100, measurement processing of identification data is performed based on the detection signal of the vibration sensor unit 1a. This processing is continued for a period until, for example, the tire 3 makes one revolution. When the detection signal of the vibration sensor unit 1a output when the tire 3 makes one rotation is input, the waveform processing unit 1b performs signal processing such as noise removal on the raw waveform which is the detection signal itself as necessary, and convert it into data. As a result, the identification data is measured.

The fact that the tire 3 has made one rotation is determined based on the time axis waveform of the detection signal of the vibration sensor unit 1a. That is, since the detection signal draws the time axis waveform shown in FIG. 5, one rotation of the tire 3 can be determined by checking the first peak value and the second peak value of the detection signal.

Subsequently, the process proceeds to step S110, and the data transmission processing is performed. As a result, the identification data obtained in step S100 is transmitted to the data communication unit 1c, and the identification data is transmitted from the data communication unit 1c. Then, the process proceeds to step S120, and it is determined from the vehicle body side system 2 whether or not there is a completion notification indicating the completion of tire identification, and the processing from step S100 is repeated until the completion notification is received.

On the other hand, as the vehicle body side processing, in step S200, it is determined whether or not the identification data transmitted from the tire side device 1 has been received. If an affirmative determination is made in step S200, the process proceeds to step S210, and if a negative determination is made, this processing is repeated again. If the identification data is transmitted in step S110 described above, an affirmative determination is made in step S200. Then, in step S210, the tire identification processing is performed based on the received identification data. In the tire identification processing, it is identified which content the tire 3 attached to the tire side device 1 that has transmitted the identification data is included in the identification target. This tire identification method is as described above.

Then, the process proceeds to step S220 to determine whether or not the tire identification is completed, and if the tire identification is completed, the process proceeds to step S230, and if the tire identification is not completed, the processing from step S200 is repeated. Then, when the process proceeds to step S230, a completion notification indicating the completion of tire identification is transmitted to the tire side device 1 through the data communication unit 21a.

As a result, an affirmative judgment is made in step S120 of FIG. 7. Then, the process proceeds to step S130, and this time, the road surface data is measured from the detection signal of the vibration sensor unit 1a. This processing is continued for a period of time, for example, until the tire 3 makes one revolution. When the waveform processing unit 1b inputs the detection signal of the vibration sensor unit 1a output when the tire 3 makes one rotation, the waveform processing unit 1b extracts the characteristic value of the time axis waveform. The extraction of this characteristic value is performed by the method as described above.

The road surface state especially appears as a change in the time axis waveform of the detection signal during the period before and after the "step-in region", "pre-kick-out region", and "kick-out region". Therefore, it is sufficient that the data during this period is input, and it is not always necessary to input all the data of the detection signals of the vibration sensor unit 1a during one rotation of the tire. For example, for the date in the "pre-step-in region" and the "post-kick-out region", it is sufficient that there is data in the vicinity of the "step-in region" or the "kick-out region". Therefore, in the region where the vibration level of the detection signal of the vibration sensor unit 1a is smaller than the threshold value, the detection signal may not input as a period during which the road surface state is not easily affected even in the "pre-step-in region" and "post-kick-out region".

Then, the process proceeds to step S140. In step S140, in order to execute data transmission for determining the road surface state, the road surface data including the characteristic value extracted during the control cycle in this time is transmitted to the data communication unit 1c. As a result, the data communication unit 1c transmits road surface data including the characteristic value.

After that, the process proceeds to step S150 to determine whether or not the vehicle has stopped. The fact that the vehicle has stopped can be determined based on the fact that the detection signal of the vibration sensor unit 1a has not changed for a predetermined time or longer. Then, when the vehicle is stopped, the tire side processing is completed, and when the vehicle is not stopped, the processing of steps S130 and S140 is repeatedly performed, and the road surface data corresponding to the road surface state of the traveling road surface is transmitted to the vehicle body side system 2.

Figure 8:
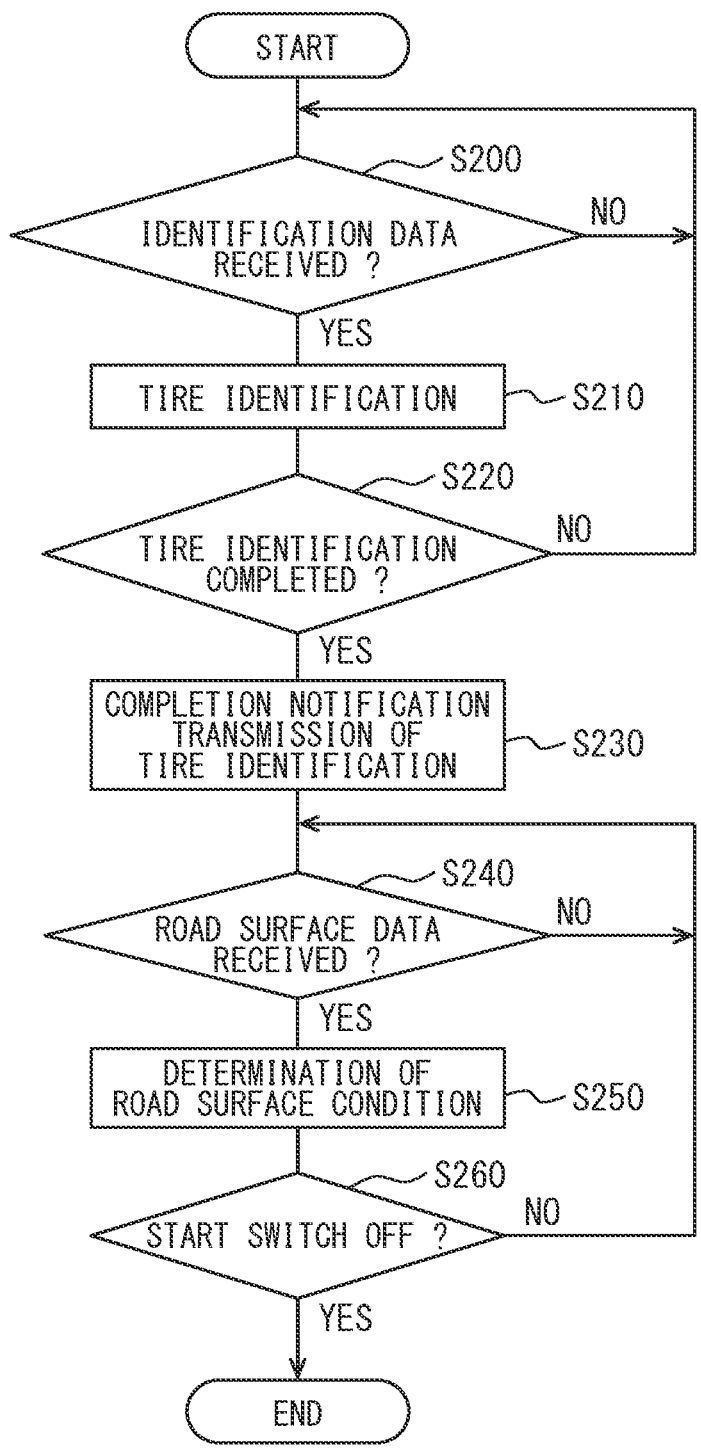
FIG. 8 is a flowchart showing details of vehicle body side processing.

On the other hand, in the vehicle body side processing, after finishing the processing in step S230 of FIG. 8, the process proceeds to step S240, and it is determined whether or not the road surface data has been received from the tire side device 1. Here, this processing is repeated until the road surface data is received and an affirmative determination is made, and when the road surface data is received, the process proceeds to step S250.

Then, in step S250, the road surface state is determined. The road surface state is determined by comparing the characteristic value included in the received road surface data with the support vector for each type of road surface corresponding to the identification target stored in the road surface determination unit 21c. At this time, the support vector to be used is a support vector corresponding to the content identified by the tire identification in step S220. Therefore, the road surface state can be determined by using the support vector most corresponding to the vibration characteristics of the tire 3 to which the tire side device 1 is attached.

Specifically, a degree of similarity between the characteristic value and all the support vectors for each type of road surface is obtained, and the road surface of the support vector with the highest degree of similarity is determined to be the current traveling road surface. For example, the calculation of the degrees of similarity of the characteristic value to all the support vectors stored for each type of the road surfaces can be performed by a method as described below.

As described above, for the determinant X representing the characteristic value, a determinant of the characteristic value is expressed as X(r), a determinant of the support vector is expressed as X(s), and a power spectrum value $a_{ik}$ as each element of the determinants is expressed by $a(r)_{ik}$ and $a(s)_{ik}$. In this case, the determinant X(r) of the characteristic value and the determinant X(s) of the support vector are respectively expressed as follows.

$$X(r) = \begin{pmatrix} a(r)_{11} & a(r)_{21} & \cdots & a(r)_{n1} \\ a(r)_{12} & a(r)_{22} & \cdots & a(r)_{n2} \\ a(r)_{13} & a(r)_{23} & \cdots & a(r)_{n3} \\ a(r)_{14} & a(r)_{24} & \cdots & a(r)_{n4} \\ a(r)_{15} & a(r)_{25} & \cdots & a(r)_{n5} \end{pmatrix} \quad \text{[Equation 3]}$$

$$X(s) = \begin{pmatrix} a(s)_{11} & a(s)_{21} & \cdots & a(s)_{n1} \\ a(s)_{12} & a(s)_{22} & \cdots & a(s)_{n2} \\ a(s)_{13} & a(s)_{23} & \cdots & a(s)_{n3} \\ a(s)_{14} & a(s)_{24} & \cdots & a(s)_{n4} \\ a(s)_{15} & a(s)_{25} & \cdots & a(s)_{n5} \end{pmatrix} \quad \text{[Equation 4]}$$

The degree of similarity indicates the degree of similarity between the characteristic value and the support vector, indicated by the two determinants, and means that the higher the degree of similarity, the more similar. In the case of the present embodiment, the road surface determination unit 21c determines the degree of similarity using the kernel method, and determines the road surface state based on the degree of similarity. Here, an inner product of the determinant X(r) of the characteristic value and the determinant X(s) of the support vector, that is, a distance between coordinates indicated by the characteristic vectors Xi of the individual sections divided for each time window of the predetermined time width T in a characteristic space, is calculated and used as the degree of similarity.

Figure 9:
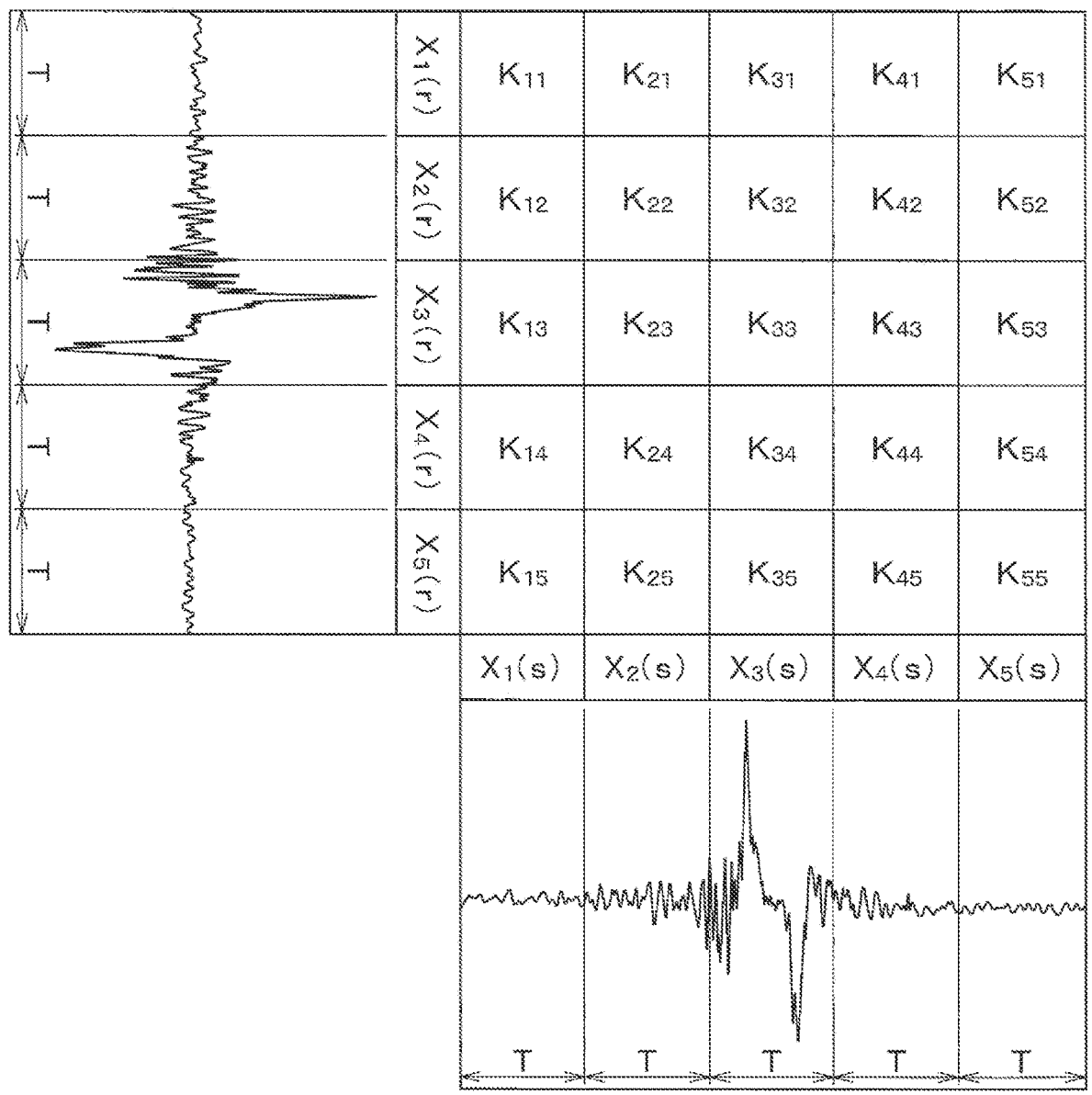
FIG. 9 is a graph illustrating respective relationships between determinants $Xi(r)$ and $Xi(s)$ and a distance $K_{yz}$ in each of the segments determined by dividing, by each of the time windows having the predetermined time width T, a time axis waveform during a present-time tire rotation and a time axis waveform during an immediately previous tire rotation.

For example, as shown in FIG. 9, regarding the time axis waveform of the detection signal of the vibration sensor unit 1a, each of the time axis waveform at the time of present rotation of the tire 3 and the time axis waveform of the support vector is divided into each section by the time window of the predetermined time width T. In the illustrated example, since each time axis waveform is divided into five sections, "n" is 5, and "i" is represented by 1≤i≤5. Here, as shown in the figure, the characteristic vector Xi of each section at the time of present rotation of the tire 3 is Xi(r), and the characteristic vector of each section of the support vector is Xi(s). In this case, regarding the distance $K_{yz}$ between the coordinates indicated by the characteristic vector Xi of each section, it is shown like a cell where a horizontal cell including the characteristic vector Xi(r) of each section at the time of present rotation of the tire 3 and a vertical cell containing the characteristic vector Xi(s) of the support vector intersect. As for the distance $K_{yz}$, "y" is obtained by rewriting "i" in Xi (s), and "z" is obtained by rewriting "i" in Xi(r). The numbers of sections between the support vector and the present rotation of the tire 3 may become different depending on the vehicle speed. It is however assumed here that the numbers of sections are equal.

In case of the present embodiment, the characteristic vectors are acquired by dividing into five specific frequency bands. Therefore, the characteristic vector Xi of each section is represented in the six-dimensional space combined with the time axis, and the distance between the coordinates indicated by the characteristic vectors Xi of the individual sections is the distance between the coordinates in the six-dimensional space. However, the distance between the coordinates indicated by the characteristic vector of each section is smaller and larger as the characteristic quantity and the support vector are more similar and less similar, respectively. Therefore, the similarity becomes higher as the distance becomes smaller, and the similarity becomes lower as the distance becomes larger.

For example, in case the sections 1 to n are provided by time division, the distances $K_{yz}$ between the coordinates represented by the characteristic vectors in the individual sections 1 is expressed by the following equation.

$$K yz = \frac{}{\sqrt{\{a(r)_{11} - a(s)_{11}\}^2 + \{a(r)_{12} - a(s)_{12}\}^2 + \cdots \{a(r)_{15} - a(s)_{15}\}^2}} \quad \text{[Equation 5]}$$

In this way, the distance $K_{yz}$ between the coordinates indicated by the characteristic vectors of the individual sections by time division is acquired for all the sections, a total sum $K_{total}$ of the distances $K_{yz}$ of all sections is calculated, and this total $K_{total}$ is used as a value corresponding to the degree of similarity. Then, the total $K_{total}$ is compared with a predetermined threshold value Th. If the total $K_{total}$ is larger than the threshold value Th, the degree of similarity is determined to be low. If the total $K_{total}$ is smaller than the threshold value Th, the degree of similarity is determined to be high. The degree of similarity is calculated for all the support vectors, and it is determined that the type of the road surface corresponding to the support vector having the highest similarity is determined to be the road surface state of the presently traveling road. Thus, the road surface state can be determined.

Here, the total sum $K_{total}$ of the distances $K_{yz}$ between the two coordinates indicated by the characteristic vectors of the respective sections is used as the value corresponding to the degree of similarity. However, another parameter indicating the degree of similarity may be used. For example, as a parameter indicating the degree of similarity, an average distance $K_{ave}$, which is an average value of the distance $K_{yz}$ obtained by dividing the total $K_{total}$ by the number of sections, can be used. Further, as shown in JP 2014-35279 A, the degree of similarity can be obtained by using various kernel functions. Instead of using all of the characteristic vectors, the degree of similarity may be calculated by excluding a path having a low similarity from the characteristic vectors. The entire disclosure of the above JP 2014-35279 A is incorporated herein by reference.

As described above, in the tire system of the present embodiment, the tire identification for identifying which of the contents included in the determined identification target is included in the tire 3 is performed, and the road surface state can be determined t by using the support vector corresponding to the tire identification result. Therefore, the road surface state can be determined by using the support vector most corresponding to the vibration characteristics of the tire 3 to which the tire side device 1 is attached, and the road surface state can be determined more accurately and in a short time.

Second Embodiment

A second embodiment will be described. The present embodiment is a modification of the tire side processing and the vehicle body side processing with respect to the first embodiment, and the other parts are the same as those of the first embodiment. Therefore, only the parts different from the first embodiment will be described.

Figure 10:
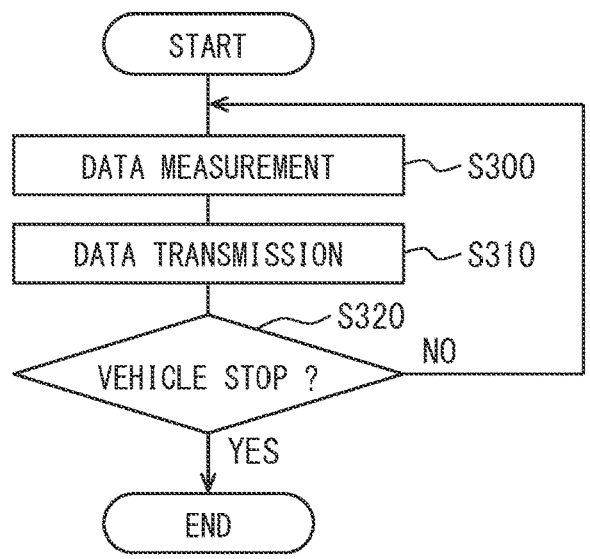
FIG. 10 is a flowchart showing details of tire side processing of a second embodiment.
Figure 11:
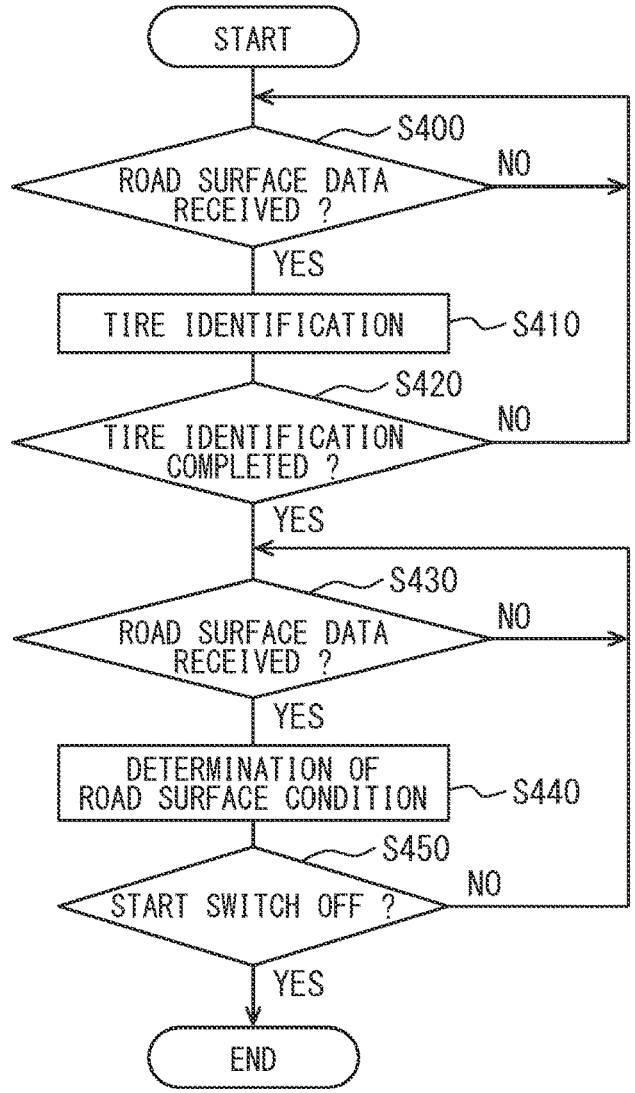
FIG. 11 is a flowchart showing details of vehicle body side processing of the second embodiment.

In the first embodiment, the identification data is composed of data different from the road surface data, but in the present embodiment, the identification data is composed of the same data as the road surface data, that is, the road surface data is used as the identification data. Then, the processing shown in FIG. 10 is executed instead of FIG. 7 as the tire side processing, and the processing shown in FIG. 11 is executed instead of the above processing shown in FIG. 8 as the vehicle body side processing.

First, in the tire side processing, in step S300, the road surface data is measured from the detection signal of the vibration sensor unit 1a. This processing is executed in the same manner as in step S130 of FIG. 7. Then, the process proceeds to step S310, and data transmission of road surface data is executed. At this time, only the road surface data is transmitted as the data transmission. The transmitted road surface data is used as identification data until the tire identification is completed, and after the tire identification is completed, the road surface data is used for determining the road surface state. Then, in step S320, it is determined whether or not the vehicle has stopped, and the processing of steps S300 and S310 are repeated until the vehicle stops.

On the other hand, in the vehicle body side processing, in steps S400 to S420, the same processing as in steps S200 to S220 of FIG. 8 is performed. However, in step S400, in determining whether or not the identification data has been received, if the road surface data has been received, it is determined that the identification data has been received. Further, the tire identification in step S410 is performed based on the road surface data, for example, based on the characteristic value included in the road surface data.

Then, in steps S430 to S450, the same processing as in steps S240 to S260 of FIG. 8 is performed. When the identification data is composed of the same data as the road surface data, it is not necessary to switch from the identification data to the road surface data as in the case where the identification data is composed of different data from the road surface. Therefore, the process proceeds to step S430 without sending the completion notification indicating the completion of tire identification, which was executed in step S230 of FIG. 8.

As described above, when the tire can be identified based on the feature amount included in the road surface data, the tire can be specified by using the road surface data as the identification data. In that case, the tire side device 1 only needs to repeatedly transmit the road surface data, and the vehicle body side system 2 may identify the tire based on the road surface data. Further, when the road surface data is used as the identification data, the tire side device 1 simply repeatedly transmits the road surface data, so that it is not necessary to transmit the completion notification indicating the completion of the tire identification. When the road surface data is used as the identification data, the tire side device 1 does not need to switch from the identification data to the road surface data, and it is not necessary to know that the tire identification is completed. Therefore, in the case of the present embodiment, the communication from the vehicle body side system 2 to the tire side device 1 does not necessarily have to be performed, and the data communication may be one way communication in which the data communication is performed only from the tire side device 1 to the vehicle body side system 2.

Third Embodiment

A third embodiment will be described. In the present embodiment, a processing when the tire identification cannot be completed is added with respect to the first embodiment, and other parts are the same as those in the first embodiment. Therefore, only the parts different from the first embodiment will be described.

In the first embodiment, it is premised that the tire identification can be completed based on the identification data, but it may not be completed even after a certain period of time has passed from the start of traveling of the vehicle. In this case, the determination of the road surface state can be prioritized over the identification of the tire, which is unknown when it can be completed. In order to realize this processing, in the present embodiment, a standard support vector as a default value is stored in advance in the support vector storage unit 21b at the time of vehicle delivery.

Figure 12:
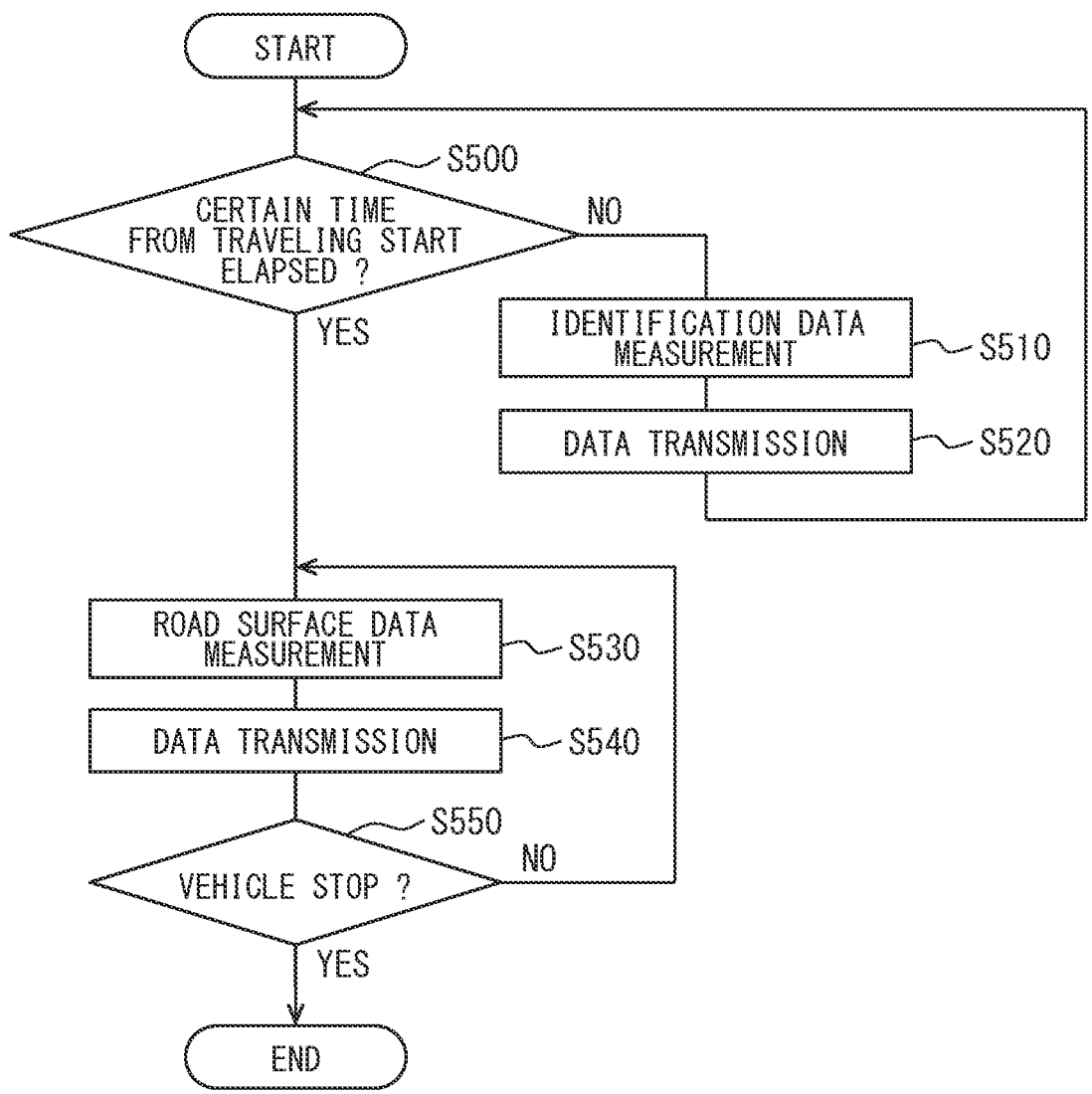
FIG. 12 is a flowchart showing details of tire side processing of a third embodiment.
Figure 13:
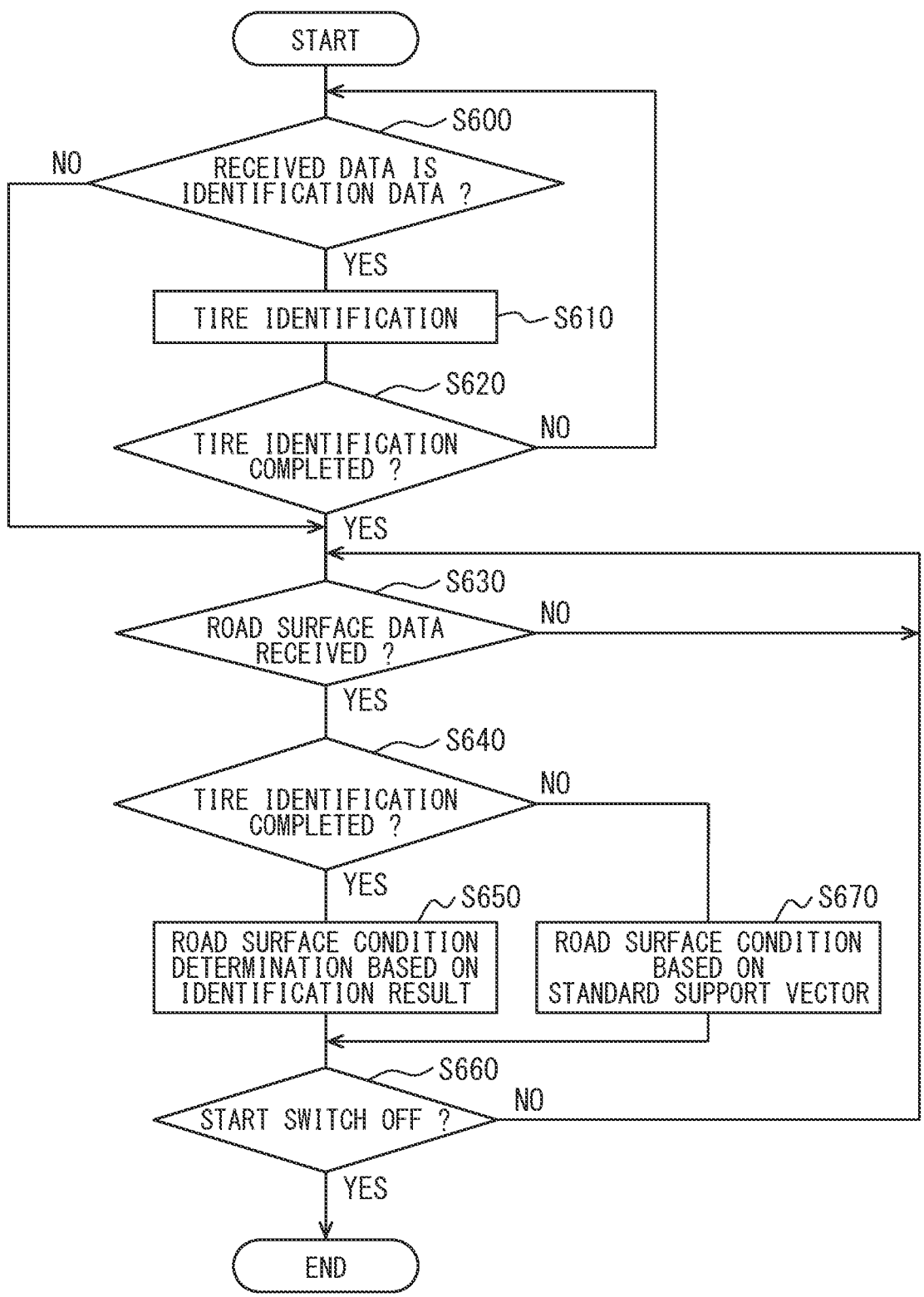
FIG. 13 is a flowchart showing details of vehicle body side processing of the third embodiment.

The standard support vector is a support vector for all tires with enhanced robustness, and is used for determining the road surface state before the tire is identified or when the tire cannot be identified. Since this standard support vector is the support vector for all tires with enhanced robustness, the road surface state can be determined by comparing with the road surface data even when the tire cannot be identified. However, since it is not the support vector most compatible with the vibration characteristics of the tire 3, it is difficult to accurately determine the road surface state in a short time. However, it is not always possible to identify the tire, and if the tire cannot be identified, it is preferable that the road surface state can be determined even if the accuracy is not high for the determination of the road surface state and it takes time. Therefore, in the present embodiment, the processing shown in FIG. 12 is executed as the tire side processing instead of the above-mentioned processing shown in FIG. 7, and the process shown in FIG. 13 is executed as the vehicle body side processing instead of the above-mentioned processing shown in FIG. 8.

First, as a tire side processing, it is determined in step S500 whether or not a certain time has elapsed from the start of traveling of the vehicle. The certain time in step S500 is a time provided with a certain margin from the time estimated to be necessary for tire identification from the start of traveling of the vehicle. Further, the elapsed time of the start of traveling of the vehicle can be measured, for example, by incrementing a count value of a counter built in the tire identification unit 21d or the like each time a negative determination is made in the processing of step S500. Then, when the count value of the counter reaches the threshold value, it is determined that the certain time has elapsed in this processing.

Here, a certain time has not yet passed when the vehicle starts traveling. Therefore, a negative determination is made in step S500, and the process proceeds to step S510. Then, in steps S510 and S520, the same processing as in steps S100 and S110 of FIG. 7 is performed, and then the processing of step S500 is repeated. As a result, the identification data is repeatedly transmitted from the start of traveling of the vehicle until the certain time elapses.

Then, when a certain time elapses from the start of traveling of the vehicle and a positive determination is made in step S500, the process proceeds to steps S530 to S550, and by executing the same processing as in steps S130 to S150 of FIG. 7, the transmission of road surface data is repeated until the vehicle stops.

On the other hand, in the vehicle body side processing, in steps S600 to S620, substantially the same processing as in steps S200 to S220 of FIG. 8 is performed. However, in step S600, it is determined whether or not the received data is the identification data, not whether or not the identification data transmitted from the tire side device 1 has been received. If affirmative determination is made, the processes of steps S610 and S620 are executed. Therefore, when the identification data is transmitted within a certain period of time from the start of traveling of the vehicle, the tire identification is performed. Then, the tire identification is performed by the method described in the first embodiment, but after a certain period of time has passed from the start of traveling of the vehicle, the identification data is not transmitted tires are specified from the tire side device 1 after that regardless of whether or not the tire identification is completed. Therefore, a negative determination is made in step S600, and the processing of step S630 is executed.

Then, after performing the same processing as in step S240 of FIG. 8 in step S630, it is determined in step S640 whether or not the tire identification is completed. This processing is performed as the same processing as in step S220 of FIG. 8. If an affirmative determination is made in step S640, in steps S650 and S660, the same processing as in steps S250 and S260 of FIG. 8 is performed. That is, until the start switch is turned off, the road surface state is determined using the support vector corresponding to the content identified by the tire identification. Then, if a negative determination is made, the process proceeds to step S670, and the road surface state is determined using the standard support vector.

As described above, when the tire can be identified, the road surface state is determined using the support vector most corresponding to the vibration identification of the tire 3. If the tires cannot be identified even after a certain period of time has passed since the vehicle started traveling, the road surface state is determined using the standard support vector. As a result, even if the tire cannot be identified, it is possible to guarantee that the road surface state is at least determined.

Fourth Embodiment

A fourth embodiment will be described. In the present embodiment, the tire identification is performed based on the user's instruction with respect to the first to third embodiments, and the other aspects are the same as those in the first to third embodiments, and hence only the parts different from the first to the third embodiments will be described. Although the case where the present embodiment is applied to the first embodiment will be described here, it can also be applied to the second and third embodiments.

Figure 14:
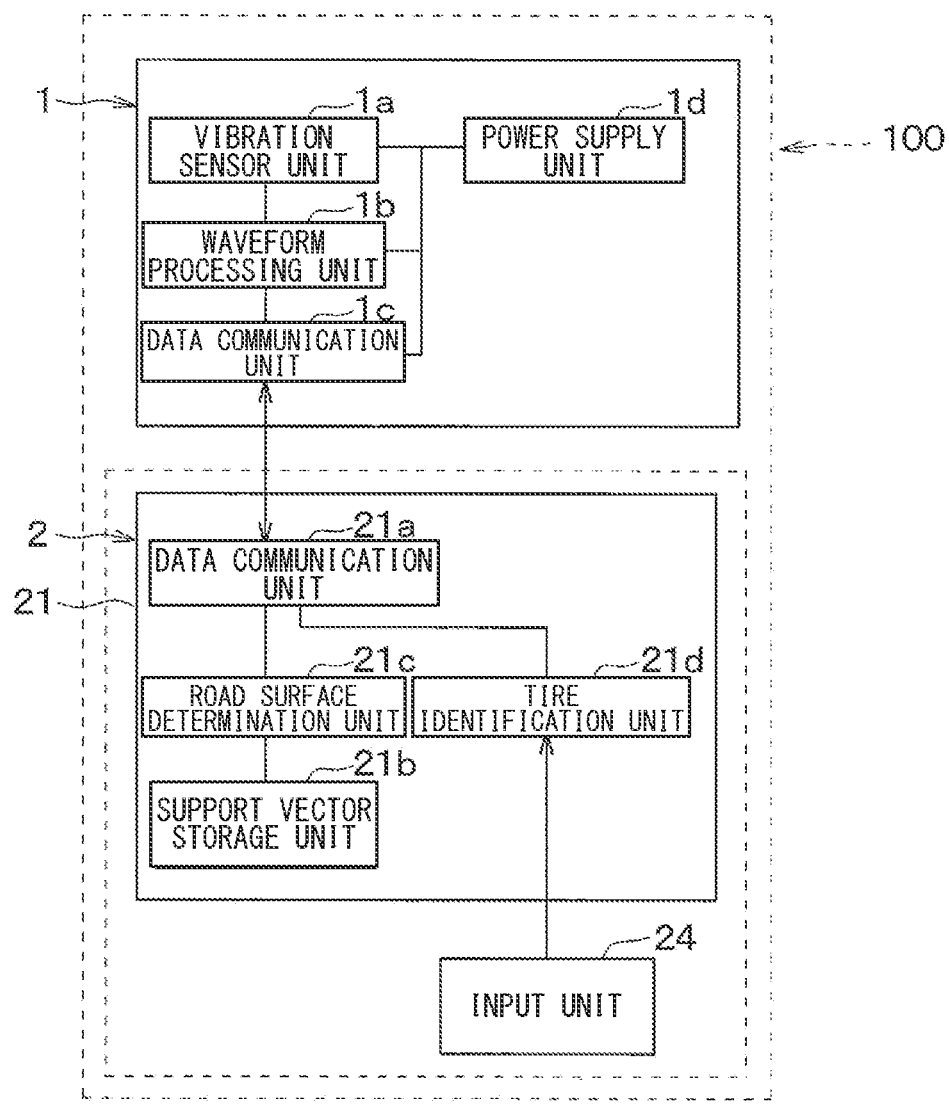
FIG. 14 is a block diagram showing a detailed configuration of a tire side device and a vehicle body side system which constitute a tire system according to a fourth embodiment.
Figure 15:
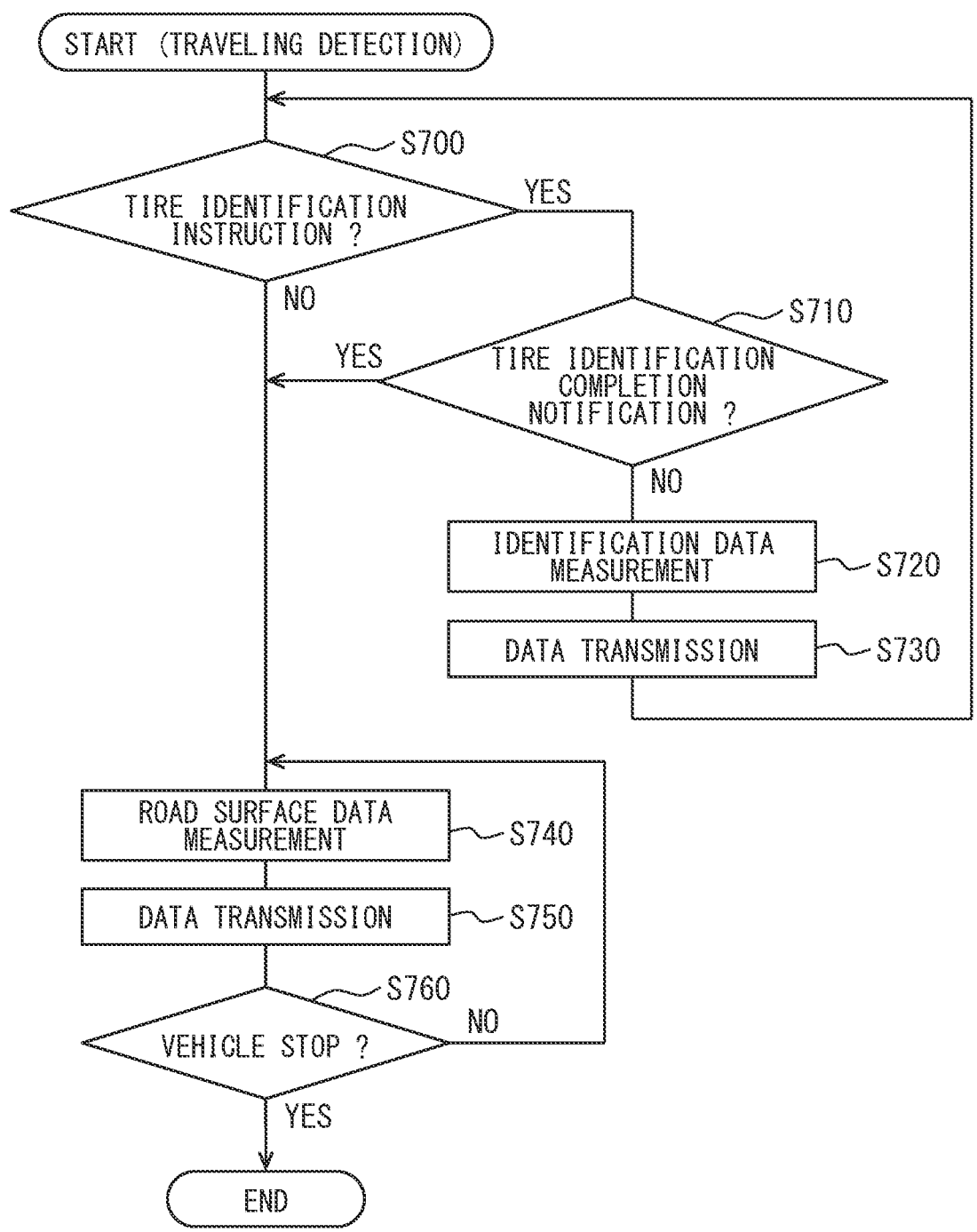
FIG. 15 is a flowchart showing details of tire side processing of the fourth embodiment.
Figure 16:
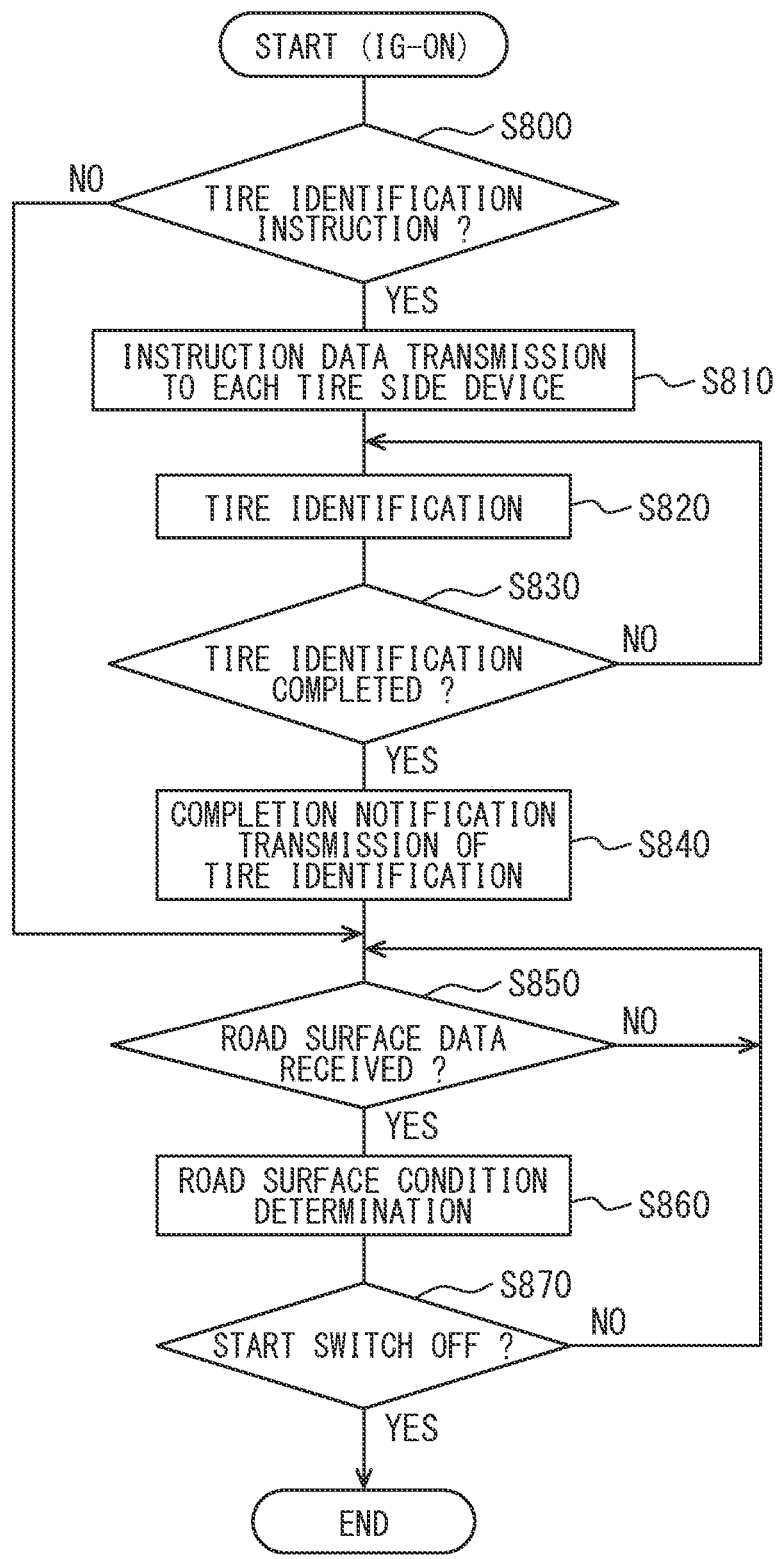
FIG. 16 is a flowchart showing details of vehicle body side processing of the fourth embodiment.

In the first to third embodiments, the tires are identified when the vehicle starts running without taking the user's instruction into consideration, but the tires may be identified only when the user's instruction is given. As shown in FIG. 14, in the present embodiment, the vehicle body side system 2 includes an input unit 24 for inputting a user operation, and a tire identification instruction signal from the input unit 24 is input to the receiver 21. The input unit 24 corresponds to, for example, an operation switch (not shown) attached to an instrument panel, a touch panel of a navigation system, or the like, and is a part instructing the user to identify a tire when changing tires or the like. The tire side processing and the vehicle body side processing are executed based on the tire identification instruction signal input from the input unit 24. Specifically, in the present embodiment, the processing shown in FIG. 15 is executed as the tire side processing, and the processing shown in FIG. 16 is executed as the vehicle body side processing.

First, as the tire side processing, it is determined whether or not there is a tire identification instruction in step S700. As will be described later, when the tire identification instruction signal is transmitted from the input unit 24 to the receiver 21, in the vehicle body side processing, an instruction data indicating that the instruction signal has been input from the receiver 21 is transmitted to each tire side device 1. Therefore, in step S700, it is determined whether or not the instruction data is received.

If an affirmative judgment is made in step S700, the process proceeds to step S710, and it is determined whether or not there is a tire identification completion notification. If the negative determination is made in step S700 and the tire identification has not been completed yet, the same processing as in steps S100 and S110 of FIG. 7 is performed in steps S720 and S730. Then, the processing is repeated until the tire identification is completed. Then, if a negative determination is made in step S700 or an affirmative determination is made in step S710, the process proceeds to step S740 and subsequent steps, and the same processing as in steps S130 to S150 of FIG. 7 is performed.

On the other hand, in the vehicle body side processing, in step S800, it is determined whether or not the user has issued a tire identification instruction through the input unit 24, that is, whether or not a tire identification instruction signal has been input. If an affirmative determination is made in step S800, the process proceeds to step S810, and instruction data indicating that an instruction signal has been input to each tire side device 1 is transmitted from the data communication unit 21a. After that, in step S820, the identification data transmitted from the tire side device 1 is received, and the same tire identification processing as in step S210 of FIG. 8 is performed. Then, the process proceeds to step S830. Then, in steps S830 to S870, the same processing as in steps S220 to S260 of FIG. 8 is performed.

As described above, it is also possible to identify the tire when instructed by the user. By doing so, it is possible to prevent the tires from being unnecessarily identified each time the vehicle starts traveling, and to identify the tires only when it is really necessary.

Fifth Embodiment

A fifth embodiment will be described. In the present embodiment, the support vector used when the tire is identified is acquired from a communication center with respect to the first to fourth embodiments, and the other parts are the same as those in the first to fourth embodiments. Only the parts different from the first to fourth embodiments will be described.

Figure 17:
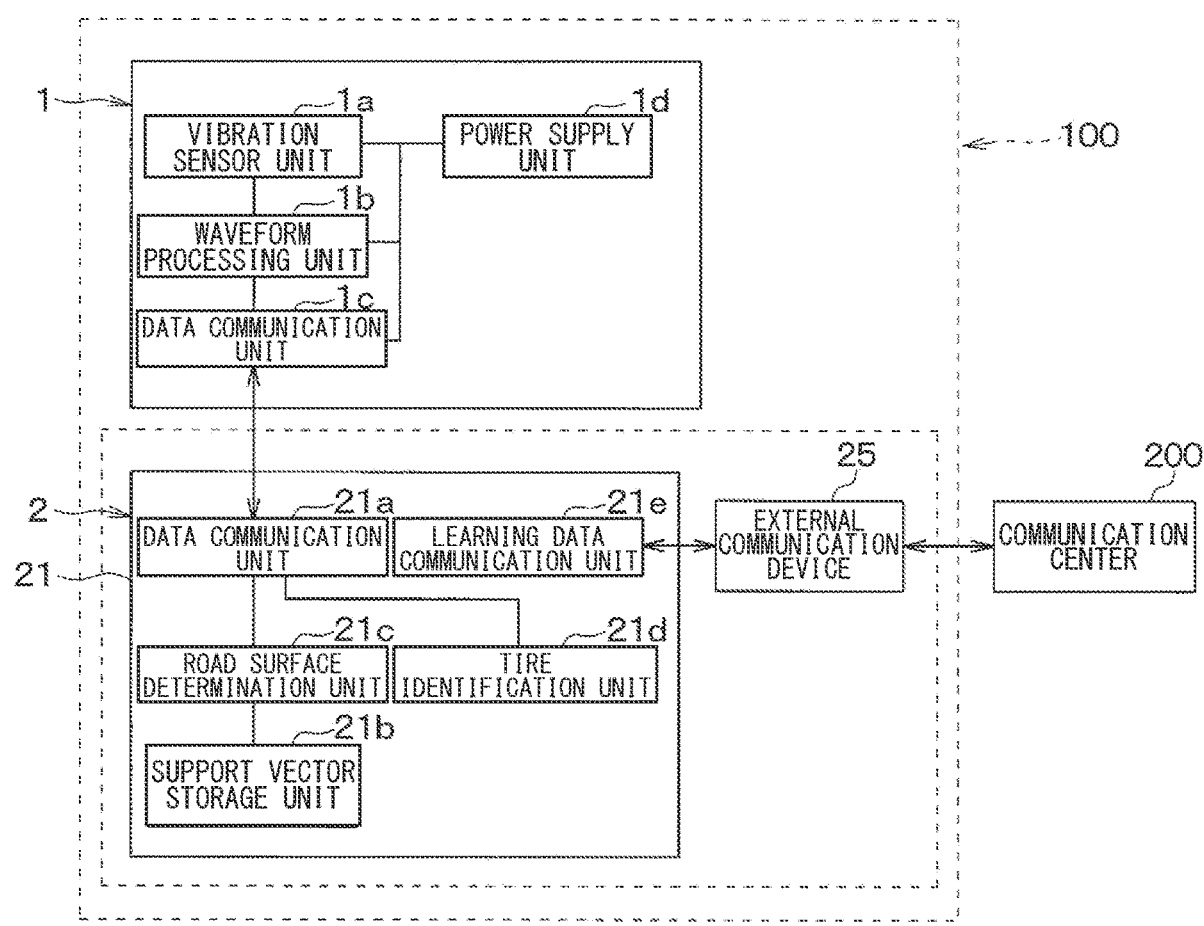
FIG. 17 is a block diagram showing a detailed configuration of each part constituting the tire system according to a fifth embodiment.

As shown in FIG. 17, in the present embodiment, the receiver 21 is provided with a learning data communication unit 21e, the vehicle body side system 2 is provided with an external communication device 25, and it is possible to communicate with an external communication center 200.

The learning data communication unit 21e plays a role of transmitting the tire identification result to the communication center 200 through an external communication device 25, acquiring the data of the support vector corresponding to the tire identification result sent from the communication center 200, and training the support vector storage unit 21b.

The external communication device 25 is a device for performing data communication with the communication center 200 via a wireless network such as a DCM (Data Communication Module). In the case of the present embodiment, when the external communication device 25 receives the data indicating the tire identification result via the data communication unit 21e transmits data, the result is transmitted to the communication center 200. Further, since the data of the support vector corresponding to the transmitted tire identification result is transmitted from the communication center 200, the data is acquired and transmitted to the learning data communication unit 21e.

The communication center 200 functions as a computer server that aggregates and stores the support vectors for each content of tire identification, that is, "tire type", "tire type identifying tire manufacturer", "tire brand", or "tire classification". When the communication center 200 sends data indicating the tire identification result from each vehicle through the external communication device 25, the communication center 200 is adapted to transmit the data of the support vector corresponding to the tire identification result to the vehicle sending the result.

In this way, when the tire is identified, the result is transmitted to the communication center 200, the support vector corresponding to the tire identification result is acquired from the communication center 200, and the support vector is stored in the support vector storage unit 21b. In this way, it is not necessary to store in advance all the support vectors for each content in which various tires are identified in the support vector storage unit 21b. The amount of data in the support vector is large, and the more types that are stored, the larger the amount of data. Therefore, the communication center 200 is responsible for storing a huge amount of data of the support vector, and the support vector storage unit 21b of each vehicle stores the necessary support vector so that the storage capacity in the support vector storage unit 21b can be reduced.

In such a case, it is preferable to be able to determine the road surface state even before the tire identification is completed or even if the tire identification is impossible. Therefore, it is preferable to store the standard support vector as the default value as described in the third embodiment in the support vector storage unit 21b.

Other Embodiments

Although the present disclosure has been described in accordance with the above-described embodiments, the present disclosure is not limited to the above-described embodiments, and encompasses various modifications and variations within the scope of equivalents. In addition, while the various combinations and configurations, which are preferred, other combinations and configurations, including more, less or only a single element, are also within the spirit and scope of the present disclosure.

(1) For example, in each of the embodiments described above, the case where the vibration sensor unit 11 forming the vibration detection unit is formed of the acceleration sensor is shown by way of example. However, the vibration sensor unit 1a can also be formed of another element capable of detecting vibration such as, e.g., a piezoelectric element.

(2) Further, in each of the above embodiments, data including the characteristic value is used as the road surface data indicating the road surface state appearing in the detection signal of the vibration sensor unit 11. However, this is only one example, and other data may be used as the road surface data. For example, integrated value data of the vibration waveform of each of the five regions R1 to R5 included in the vibration data of one rotation of the tire 3 may be used as the road surface data, or raw data of the detection signal itself may be used as the road surface data.

Similarly, the raw waveform data is used for the identification data for identifying the tire, but even if it is not the raw waveform data, the data suitable for the tire identification may be extracted from the detection signals output by the vibration sensor unit 1a, and be used as the identification data. For example, only the data of the frequency band suitable for tire identification may be extracted from the detection signal and used as the identification data.

(3) Further, in the fifth embodiment, the tire identification result is transmitted to the communication center 200, and the support vector corresponding to the result is transmitted from the communication center 200 to each vehicle. The above configuration is also only an example, and the identification data transmitted from the tire side device 1 via the receiver 21 is transmitted to the communication center 200, the tire identification is performed in the communication center 200, and the support vector corresponding to the tire identification result may be transmitted to each vehicle.

(4) Also, in each of the embodiments described above, the road surface determination unit 21c of the receiver 21 included in the vehicle body side system 2 determines the degree of similarity of the feature quantities to the support vectors and determines the road surface state. However, this is only one example. It is also possible that any sections in the vehicle body side system 2, e.g., other ECU such as the brake ECU 22 may be configured to determine the degree of similarity, determine the road surface state and transmit the instruction signal.

(5) Further, although the support vector is given as an example of the teacher data used for determining the road surface state, other known teacher data may be used.

(6) In each of the embodiments described above, the tire side device 1 is provided in each of the plurality of tires 3. However, it is sufficient that the tire side device 1 is provided in at least one of the plurality of tires 3.

What is claimed is:

1. A road surface state determination device, comprising:
a tire side device provided on a tire of a vehicle; and
a vehicle body side system provided on a vehicle body, wherein
the tire side device includes
a vibration detection unit configured to output a detection signal corresponding to a magnitude of vibration of the tire,
a waveform processing unit configured to generate a road surface data indicating a road surface state that appears in a waveform of the detection signal, and
a first data communication unit configured to transmit the road surface data,
the vehicle body side system includes
a second data communication unit configured to receive the road surface data transmitted from the first data communication unit,
a road surface determination unit configured to determine the road surface state on a traveling road surface of the vehicle based on the road surface data and teacher data, and
a processor configured to
store the teacher data, and
identify which type the tire corresponds to in a predetermined type as an identification target,
the tire side device, in the waveform processing unit, configured to generate an identification data used for tire identification based on the detection signal, and transmit the identification data through the first data communication unit, and
the vehicle body side system identifies the tire based on the identification data transmitted from the tire side device and determines the road surface state by using the teacher data corresponding to the tire identification, when the road surface determination unit determines the road surface state.

2. The road surface state determination device according to claim 1, wherein
the type as the identification target is any one of a tire type, a tire manufacturer including the tire type, a tire brand, and a tire classification classified among tires having similar vibration characteristics.

3. The road surface state determination device according to claim 1, wherein
the tire side device detects a start of traveling of the vehicle based on the detection signal, and transmits the identification data at the start of traveling of the vehicle.

4. The road surface state determination device according to claim 1, wherein
the tire side device transmits the identification data until a certain time elapses from a start of traveling of the vehicle, and after the certain time elapses, switches from the identification data and transmits the road surface data, and
the vehicle body side system determines the road surface state by using the teacher data corresponding to the tire identification, when the tire identification is completed based on the identification data, and determines the road surface state is determined by using a default value stored in advance in the processor as the teacher data, if the tire identification is completed even if the road surface data is transmitted.

5. The road surface state determination device according to claim 1, wherein
the tire side device transmits the road surface data as the identification data, and
the vehicle body side system uses the road surface data as the identification data to identify the tire.

6. The road surface state determination device according to claim 1, wherein
the vehicle body side system has an input unit for inputting an execution instruction for the tire identification from the user, and transmits instruction data indicating that the tire identification is performed to the tire side device through the second data communication unit when the execution instruction of the tire identification is input to the input unit, and
the tire side device transmits the identification data, when the first data communication unit receives the instruction data.

7. The road surface state determination device according to claim 1, wherein
the processor stores the teacher data corresponding to a content of the tire to be specified, and the road surface determination unit determines the road surface state by using the teacher data stored in the processor that corresponds to the tire identification.

8. A tire system comprising:
a road surface state determination device according to claim 1, and
a communication center configured to perform data communication with the vehicle body side system, and to store the teacher data according to a content of the tire to be identified, wherein
the vehicle body side system includes an external communication device that communicates with the communication center, and transmits the tire identification to the communication center through the external communication device, and
the communication center transmits the teacher data corresponding to the tire identification to the external communication device, when the communication center receives the tire identification from the external communication device.

9. A road surface state determination device, comprising:
a tire side device provided on a tire of a vehicle; and
a vehicle body side system provided on a vehicle body, wherein
the tire side device includes;
  a first processor, and
  a first memory configured to store computer readable instructions that, when executed by the first processor, cause the tire side device to:
    output a detection signal corresponding to a magnitude of vibration of the tire,
    generate a road surface data indicating a road surface state that appears in a waveform of the detection signal, and
    transmit the road surface data,
the vehicle body side system includes;
  a second processor, and
  a second memory configured to store computer readable instructions that, when executed by the second processor, cause the vehicle body side system to:
    receive the road surface data transmitted from the tire side device,
    store teacher data,
    determine the road surface state on a traveling road surface of the vehicle based on the road surface data and the teacher data, and
    identify which type the tire corresponds to in a predetermined type as an identification target,
the tire side device is caused to generate an identification data used for the tire identification based on the detection signal, and transmit the identification data, and
the vehicle body side system is caused to identify the tire based on the identification data transmitted from the tire side device and determine the road surface state by using the teacher data corresponding to the tire identification, when the road surface state is determined.

* * * * *